(12) United States Patent
Roth et al.

(10) Patent No.: US 9,623,394 B2
(45) Date of Patent: Apr. 18, 2017

(54) DEVICE AND METHOD FOR THE GENERATION OF MOLECULAR MICROARRAYS

(75) Inventors: Günter Roth, Freiburg (DE); Jürgen Burger, Denzlingen (DE)

(73) Assignee: ALBERT-LUDWIGS-UNIVERSITAET FREIBURG, Freiburg (DE)

( * ) Notice: Subject to any disclaimer, the term of this patent is extended or adjusted under 35 U.S.C. 154(b) by 671 days.

(21) Appl. No.: 13/983,449

(22) PCT Filed: Feb. 3, 2012

(86) PCT No.: PCT/EP2012/051816
§ 371 (c)(1),
(2), (4) Date: Oct. 14, 2013

(87) PCT Pub. No.: WO2012/104399
PCT Pub. Date: Aug. 9, 2012

(65) Prior Publication Data
US 2014/0038854 A1 Feb. 6, 2014

(30) Foreign Application Priority Data
Feb. 3, 2011 (DE) .................. 10 2011 010 307

(51) Int. Cl.
*B01J 19/00* (2006.01)
*B01L 3/00* (2006.01)
*B82Y 30/00* (2011.01)

(52) U.S. Cl.
CPC .......... *B01J 19/0046* (2013.01); *B01L 3/508* (2013.01); *B82Y 30/00* (2013.01);
(Continued)

(58) Field of Classification Search
CPC .......... B01J 19/0046; B01J 2219/00495; B01J 2219/00529; B01J 2219/00533;
(Continued)

(56) References Cited

U.S. PATENT DOCUMENTS 6,653,124 B1   11/2003   Freeman
6,800,453 B2   10/2004   Labaer et al.
(Continued)

FOREIGN PATENT DOCUMENTS

WO   00/27521 A1   5/2000
WO   02/14860 A1   2/2002
(Continued)

OTHER PUBLICATIONS

Lin et al. (J. Amer. Chem. Soc., 2005, 127:11210-11211).*
(Continued)

*Primary Examiner* — Jeremy C Flinders
(74) *Attorney, Agent, or Firm* — Joyce von Natzmer; Agris & von Natzmer LLP

(57) ABSTRACT

The invention relates to a device and a method for the generation of molecular microarrays. The invention relates therefore to a universal approach for the generation of protein microarrays, DNA microarrays and RNA microarrays (in general nucleic acid microarrays), by production of an output molecule from a template molecule microarray via enzymatic or chemical processes and transfer of the output molecule onto the desired molecular microarray.

54 Claims, 14 Drawing Sheets

Figure 1:
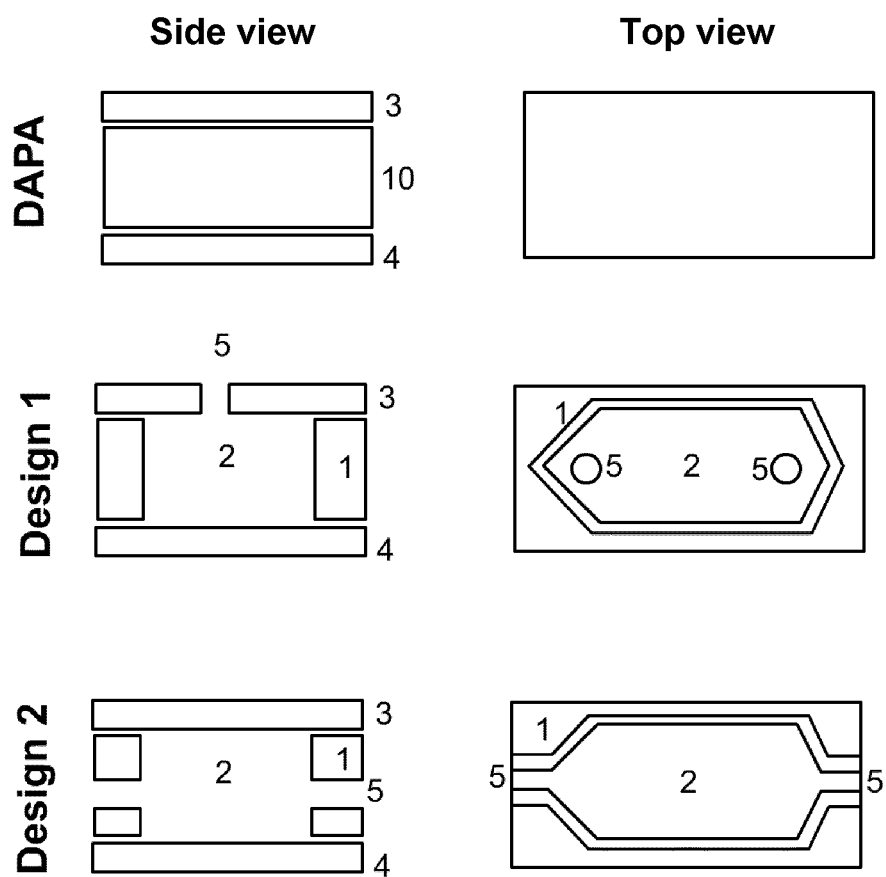

(52) U.S. Cl.
CPC  *B01J 2219/0061* (2013.01); *B01J 2219/0063* (2013.01); *B01J 2219/00286* (2013.01); *B01J 2219/00337* (2013.01); *B01J 2219/00495* (2013.01); *B01J 2219/00529* (2013.01); *B01J 2219/00533* (2013.01); *B01J 2219/00585* (2013.01); *B01J 2219/00596* (2013.01); *B01J 2219/00605* (2013.01); *B01J 2219/00608* (2013.01); *B01J 2219/00626* (2013.01); *B01J 2219/00637* (2013.01); *B01J 2219/00659* (2013.01); *B01J 2219/00675* (2013.01); *B01J 2219/00722* (2013.01); *B01J 2219/00725* (2013.01); *B01L 2200/0689* (2013.01); *B01L 2300/0636* (2013.01); *B01L 2300/0822* (2013.01)

(58) Field of Classification Search
CPC .... B01J 2219/00585; B01J 2219/00596; B01J 2219/00605; B01J 2219/00608; B01J 2219/0061; B01J 2219/00286; B01J 2219/0063; B01J 2219/00637; B01J 2219/00659; B01J 2219/00675; B01J 2219/00722; B01J 2219/00725; B01J 2219/00337; B01J 2219/00626; B82Y 30/00; B01L 3/508; B01L 2200/0689; B01L 2300/0636; B01L 2300/0822
See application file for complete search history.

(56) References Cited

U.S. PATENT DOCUMENTS

| | | | |
|---|---|---|---|
| 2002/0022275 | A1 | 2/2002 | Furste et al. |
| 2003/0143132 | A1 | 7/2003 | Cerrina et al. |
| 2003/0232382 | A1* | 12/2003 | Brennan ............ C12Q 1/686 435/6.18 |
| 2004/0141880 | A1* | 7/2004 | Handler ............ B01L 3/502715 506/15 |

FOREIGN PATENT DOCUMENTS

| | | | | |
|---|---|---|---|---|
| WO | 2006/002934 | A1 | 1/2006 | |
| WO | 2006/058246 | A2 | 6/2006 | |
| WO | WO 2006058246 | A2 * | 6/2006 | .......... B01J 19/0046 |
| WO | 2006/131687 | A1 | 12/2006 | |
| WO | 2009/132124 | A2 | 10/2009 | |
| WO | 2010/100265 | A1 | 9/2010 | |

OTHER PUBLICATIONS

Rowe et al. (Anal. Chem., 1999, 71:3846-3852).*
He, Mingyue; Stoevesandt, Oda; Palmer, Elizabeth A.; Khan, Farid; Ericsson, Olle and Taussig, Michael J.: "Printing protein arrays from DNA arrays" in: Nature Methods, vol. 5, No. 2, Feb. 2008, pp. 175-177.
Chandra, Harini and Srivastava, Sanjeeva: "Cell-free synthesis-based protein microarrays and their applications" in: Proteomics 2010, 10, pp. 717-730.
He, Mingyue and Taussig, Michael J.: "Single step generation of protein arrays from DNA by cell-free expression and in situ immobilisation (PISA method)" in: Nucleic Acids Research, 2001, vol. 29, No. 15 e73, pp. 1-6.
Sobek, Jens; Bartscherer, Kerstin; Jacob, Anette; Hoheisel, Jvrg D. and Angenendt, Philipp: "Microarray Technology as a Universal Tool for High-Throughput Analysis of Biological Systems" in: Combinatorial Chemistry & High Throughput Screening, 2006, 9, pp. 365-380.
Ramachandran, Niroshan et al.: "Self-Assembling Protein Microarrays" in: Science, 2004, vol. 305, pp. 86-90.
Ramachandran, Niroshan; Srivastava, Sanjeevva and Labaer, Joshua: "Applications of protein microarrays for biomarker discovery" in: Proteomics Clin Appl., Oct. 2008 ; 2(10-11), pp. 1444-1459.
Angenendt, Philipp; Nyarsik, Lajos; Szaflarski, Witold; Glökler, Jörn; Nierhaus, Knud H.; Lehrach, Hans; Cahill, Dolores J. and Lueking, Angelika: "Cell-Free Protein Expression and Functional Assay in Nanowell Chip Format" in: Anal. Chem., 2004, 76, pp. 1844-1849.
Khnouf, Ruba; Beebe, David J. and Fan, Z. Hugh: "Cell-free protein expression in a microchannel array with passive pumping" in: Lab Chip, 2009, vol. 9, pp. 56-61.
Mei, Qian; Fredrickson, Carl K.; Simon, Andrew; Khnouf, Ruba and Fan, Z. Hugh: "Cell-Free Protein Synthesis in Microfluidic Array Devices" in: Biotechnol. Prog., 2007, vol. 23, pp. 1305-1311.
Kinpara, Takeshi; Mizuno, Ryuta; Murakami, Yuji; Kobayashi, Masaaki; Yamaura, Shouhei; Hansan, Quamrul; Morita, Yasutaka; Nakano, Hideo; Yamane, Tsuneo; Tamiya, Eiichi: "A Picoliter Chamber Array for Cell-Free Protein Synthesis" in: J. Biochem., vol. 136, No. 2, 2004, pp. 149-154.
Kumar, Anil and Liang, Zicai: "Chemical nanoprinting: a novel method for fabricating DNA microchips" in: Nucleic Acids Research, 2001, vol. 29, No. 2, e2, pp. 1-4.
Du, Quan; Larsson, Ola; Swerdlow, Harold; Liang, Zicai: "DNA Immobilization: Silanized Nucleic Acids and Nanoprinting" in: Top Curr Chem, 2006, vol. 261, pp. 45-61.
Yu, A. Amy; Savas, Tim A.; Taylor, G. Scott; Guiseppe-Elie, Anthony; Smith, Henry I. and Stellacci, Francesco: "Supramolecular Nanostamping: Using DNA as Movable Type" in: Nano Letters, 2005, vol. 5, No. 6, pp. 1061-1064.
Kim, Suhyeon; Lim, Guei-Sam; Lee, Sang Eun; Lee, Jeong-Gun; Yun, Kyusik; Park, Je-Kyun Park: "DNA chip replication for a personalized DNA chip" in: Biomolecular Engineering, 2006, vol. 23, pp. 129-134.
Joohoon Kim et al: "Transfer of Surface Polymerase Reaction Products to a Secondary Platform with Conservation of Spatial Registration", in: Journal of the American Chemical Society, vol. 128, No. 37, Sep. 1, 2006, pp. 12076-12077.
Arum Amy Yu: "Supramolecular NanoStamping (SuNS); fabricating nano/bio devices using DNA as movable type", PhD Thesis, Jan. 1, 2009, pp. 1-192; Retrieved from the Internet: URL:http://dspace.mit.edu/handle/1721.1/39545.

* cited by examiner

| | |
|---|---|
| 1, 9, 16 | 100 bp+ |
| 2, 3, 4 | neg. Ctrl. |
| 5 | KTH1 (508 bp) |
| 6 | KTH2 (379 bp) |
| 7 | KTH3 (283 bp) |
| 8 | KTH4 (401 bp) |
| 10 | KTH5 (347 bp) |
| 11 | KTH6 (374 bp) |
| 12 | BBT1 (490 bp) |
| 13 | IMK1 (385 bp) |
| 14, 15 | neg. Ctrl. |

DEVICE AND METHOD FOR THE GENERATION OF MOLECULAR MICROARRAYS

CROSS-REFERENCE TO RELATED APPLICATIONS

This is the U.S. national stage of International application PCT/EP2012/051816, filed Feb. 3, 2012 designating the U.S. and claiming priority to German application DE 10 2011 010 307.4, filed Feb. 3, 2011.

DESCRIPTION

The invention relates to a device and a method for the generation of molecular microarrays. The invention relates therefore to a universal approach for the generation of protein microarrays, DNA microarrays and RNA microarrays (in general nucleic acid microarrays), by production of an output molecule from a template molecule microarray via enzymatic or chemical processes and transfer of the output molecule onto the desired molecular microarray.

BACKGROUND

State of the Art in DNA-to-Protein-Array Copying

The production of protein-microarray in the "classical setup" is to synthesize proteins in cells, followed by purification of the proteins from lysed cells and transfer of protein solution onto a microarray. This is typically carried out for each protein individually. If all protein solutions are purified a dispensing system is used to generate the protein-microarray. Even though this technique has been used for over more than a decade it is cumbersome and needs much effort in terms of time and money, especially the maintenance of the cell culture and the protein expression in the cells. This leads often to costs of more than € 1000 for each protein-microarray.

A chemical in-situ synthesis of proteins on a chip has not been successful due to the poor synthesis yield combined with the insufficient purity of the product, in comparison to the natural cell-born proteins. Only short protein fragments, so called peptides, are applicable with in-situ synthesis. But for the information value and significance the best biochemical test need to be carried out with preferably naturally expressed full-length proteins.

Approaches towards synthesis of full-length proteins based on microarrays have been developed to produce proteins directly from DNA. A review [2] published in February 2010 shows different approaches and variants. It emphasizes which of these methods have been realized already in order to generate a protein array from a DNA array as template source. One basic message is that protein can only be synthesized if the DNA has encoded several functional "information" units, like ribosome binding site, promoters etc. It could be said that the DNA has to be "expression ready" to be recognized and processed by a cell free expression mix, which is then transcribing the DNA and translating mRNA into the corresponding protein.

In 2001 He and Taussig published the PISA-System [3] (WO 02/14860). Here the DNA was mixed with the cell free expression mix directly before dispensing. Small droplets were subsequently transferred onto a surface. Each of the droplets generates the protein in accordance to the added DNA. Within the protein sequence a His-tag is encoded. This His-tag binds specifically to a so called nickel-NTA-surface. After enough protein is generated the whole surface is rinsed and therefore washed with liquid. This is removing all DNA and all proteins, which contain no His-tag. Only the proteins containing a His-tag will stick to the surface and therefore be "purified" and separated from all other proteins. This microarray could be used directly for protein-protein interaction binding measurements. In 2006 a protein-microarray made via this method containing 13,000 different proteins or protein fragments was published [4].

The PISA system circumvents the efforts of cumbersome, individual protein purification (in comparison to the classical methods of recombinant protein synthesis), but the effort to mix each template DNA sequence with cell free expression system directly before transfer to the microarray surface is still enormous. And it should be done for each spot on the microarray under exactly the same conditions, especially in respect to concentration and time parameters. This could only be realized, and in some cases only with great difficulty, with a pipetting robot.

In 2004 LaBear published the NAPPA system (Nucleic Acid Programmable Protein Array) (U.S. Pat. No. 6,800,453 B2) for the manufacture of protein arrays from DNA arrays [5]. Here a surface is needed which bears two binder molecules. Streptavidine was used and a antibody against a His-tag. Onto this dual-binder surface a DNA-microarray was printed with DNA containing a tag, which binds to the surface. A biotinylated DNA was used for proof of concept. These DNA-microarrays can be stored for up to 2 years. The shelf life of the whole NAPPA-microarray is limited by the shelf life of the antibody and the DNA. Directly before use the complete microarray is covered with cell free expression system. On each spot, defined by the DNA of the spot itself, a different protein is synthesized, which diffuses freely. But each protein contains a special sequence, which binds to the antibody. Therefore by pure statistical likelihood the antibody binds to the surface. Due to generation of the protein directly on the DNA spot, most of the protein will bind onto the spot or in its immediate proximity. After a washing step only the DNA and the desired protein remains on the surface and the microarray with the freshly synthesized proteins could be used for experiments. In 2008 a protein microarray with approx. 1000 proteins was published [6].

The advantage of NAPPA compared to PISA is to decouple the DNA-microarray preparation from protein synthesis. Whilst in PISA the proteins are directly and inherently synthesized during and after manufacturing the microarrays, the NAPPA system enables making a large number of DNA-microarrays and storing them for a long time. Important in experimental use is that the protein is freshly synthesized. Therefore the NAPPA system could be described as an "on-demand" protein microarray. Disadvantages are the dual binder system (which leads to increased cost factor) on the surface, like streptavidine and antibodies, in addition to their remaining together with the DNA on the surface (higher chance for unspecific binding).

In 2008 He et al (from the group of Michael Taussig) published the DAPA-System [1] (WO 2006/131687), a method which allows to take a DNA-microarray original and generate several copies as protein-microarrays. In this system the protein-coding DNA is dispensed as DNA-microarray onto a commercial available epoxy-functionalised surface. This is done as in classic DNA-microarray generation.

For the DAPA-system a DNA-array is brought in contact to a second surface via laying a membrane between them. The membrane has been soaked previously with a cell free expression system, which starts immediately at contact with DNA template to produce proteins based on the DNA of each spot from the microarray (like the PISA setup). The protein diffuses through the membrane and binds to the second surface. In this way a protein-microarray is generated. As catcher surface a Nickel-NTA surface is used and within the DNA an according His-Tag as specific binding sequence against this catcher surface was encoded. After app. 3 hours the sandwich is opened and the DNA-microarray as well as the protein-microarray are washed. Then the protein-microarray can be used for experiments and the DNA-microarray could either be stored until making the next protein copy or be reused immediately again to make the next protein-microarray.

Diffusion will make the protein spots larger than the DNA spots and also lead to a blurred edge due which is a characteristics of the diffusion which is inherent in the process. The diffusion blur of the edge is lesser in relation to the thinness of the membrane and the resulting diffusion distance from the DNA-array to the protein catching surface.

Compared to PISA and NAPPA the most obvious advantage of the DAPA-system is that several protein-microarray copies can be generated from only one single DNA-microarray original. Additional advantages are that there is no disturbing DNA, like in the NAPPA-system, on the protein-microarray and only one capture is needed on the protein-microarray surface at all. But this system allows at first to make several protein-microarray replicates from one DNA-microarray. This is a complete novum against all other systems.

Nevertheless the workflow of the described DAPA to generate protein-microarrays holds several unfavorable properties, which are mainly inherent or related to the membrane itself.

Firstly, there is the real physical "hard" contact between the membrane and both array surfaces, which results in scratches and/or physical abrasion over time and use. This will damage the protein array surface and limits its later use. The DNA arrays are additionally damaged, which limits their lifetime with respect to the total number of protein arrays made before the DNA is denatured or ablated by the copying process.

Secondly, the membrane is typically an inhomogeneous material which will convey protein unpredictably onto the protein array copy. The membrane itself is undefined, as it is a non-woven and therefore random material. Within this material the diffusion of the generated molecules is not omnidirectional also described as anisotropic, which means that there are preferred and not so preferred directions. Due to the fibers used within the material, diffusion along a fiber or in a particular direction favored by the fibers random or semi-random alignment could occur. This leads to an inhomogeneity of the generated protein pattern, which is a mathematical convolution of the original DNA image and the membrane inhomogeneity. As each copy process needs a new membrane, each copy is inherently different to the next, due to the differences in the membranes fine-structures. This effect becomes stronger the smaller the structure size on the DNA array. As such the factor of unpredictable and irreproducible transfer via the membrane limits the minimal resolution of this copying process and reproducibility of the method.

Thirdly, the biochemical reaction of protein production starts immediately after bringing the membrane in contact with the DNA. Therefore the assembly of the stack DNA-array, membrane, second surface is automatically coupled to the start of the reaction. This prevents assembly of several reactors and parallel initiation of microarray production. There is no defined reaction start, especially when multiple assemblies are to be carried out simultaneously. This is also reduces reproducibility.

Fourthly, the installation of the membrane is challenging due to its thinness and is therefore hard to handle. This is heightened by the fact that the protein arrays are increasingly better in quality the thinner the membrane is, but the thinner the wetted membrane is the more fragile and more difficult the handling of the membrane becomes, potentially falling apart under its own weight, buckling or entrapping air bubbles. This is also reduces reproducibility.

During assembly of the DNA-array, the membrane and the second surface, no air bubbles should be trapped by the membrane. This can only be prevented by skilled and experienced personnel.

Additionally, according to recent publications, the DAPA-device is complex and therefore error-prone in comparison to a less complex setup.

A further disadvantage is that the generation of one protein-microarray requires more than 3 hours, primarily due to limited reaction efficiency due to the active components (cell free enzyme mix) being primarily bound in or interacting with the membrane, thus creating to some degree a separation of template DNA from transcription and translation enzymes. Additionally the diffusion of the protein product through the membrane requires additional time. This leads to a prolonged expression time for the generation of the protein copy.

All these disadvantages lead to an inherently poor reproducibility of the DAPA system, in large due to the process being dependent on the membrane-mediated reaction system and output molecule transfer. By assembly the contact of the membrane and thus the cell free expression system will be made and immediately proteins produced. It is not possible in the described DAPA setup to decouple assembly and reaction start. This particular disadvantage disables the reproducibility of the whole system.

Taking these disadvantages into account, there are some microfluidic approaches to synthesize proteins from DNA using cell free expression. However these publications [7-10] in the field of microfluidics are focused only to obtain more protein with less cell free expression mix and not to fabricate protein microarrays.

State of the Art in DNA-to-DNA/RNA-Array Copying

Due to the broad commercial availability of DNA-microarrays very few research groups have aimed to take DNA-microarray originals and make copies in terms of DNA-microarrays or RNA-microarrays. Nevertheless, there has been some progress on the DNA-to-DNA copy of microarrays.

In 2001 Kumar et al [11,12] used a contact printing technique to generate a "dilution series of microarrays". Therefore a DNA-microarray was printed onto a surface with a reversible chemical bond. This DNA-microarray was brought in close conformal contact with an acrylamide surface. The chemical properties of this acrylamide surface reversibly opened the chemical bond of the DNA from the master microarray and resolved some DNA from the template (or master) onto the new array. Then the DNA was bound covalently onto the acrylamide. This step could be repeated several times and was depleting the master array until all DNA was removed. The generated DNA microarray copies could be made in two modes.

If the same resolving time was always applied a dilution series of the DNA was generated, leading to DNA microarray copies which contained less DNA for each following copy. If applied with an experimentally determined increasing resolving time all copies contained roughly the same amount of DNA. As such with this technique it is possible to generate copies of a DNA master microarray, but the DNA master microarray is depleted over time. The initial DNA amount is only distributed over all made copies. So it is a replication, but without amplification.

Yu et al presented in 2005 [13] an affinity copy of a DNA microarray. Here a primary DNA microarray was printed. This primary DNA microarray was incubated with a mix of DNA, which contained thiol-modified cDNA which binds to the according DNA on the primary microarray. As such the cDNA hybridizes exactly onto the different spots of the primary microarray. Then a gold-coated surface is brought in close conformal contact to the primary microarray. Due to this close proximity the thiol-groups interact and covalently bind to the gold surface. By heating up and splitting the two surfaces a negative copy of the initial DNA microarray was manufactured.

This enables only creation of a negative copy. Due to the use of the Thiol-gold-binding system it is not possible to make a negative of the negative, and this restricts the process to make only negatives. Additionally, the close conformal contact between the both hard surfaces is very unfavorable because it leads to very strong mechanical stress and as such to scratches and mechanical abrasion, especially of the thin gold-coating of the surface. Again the DNA was not amplified directly on the microarray; it was pre-synthesized and then applied for hybridization.

In 2006 S. Kim et al [14] avoided the conformal contact between the different surfaces by using a spacer in form of a "hole mask". They printed a microarray and hybridized the cDNA onto the different spots of the microarray. Then a mask with holes on exactly the positions of the spots was laid onto it and filled with liquid. Onto this sandwich a nylon membrane was applied. By applying heat and an attractive electrical field the cDNA was released from the primary surface and transferred to the nylon membrane. A negative DNA microarray copy was generated. After blocking, the surface could be used for the experiments.

This setup enables again the negative microarray copies, but the correct blocking of the surface of this negative copy would allow to repeat this process from the negative, so that a negative negative copy and as such a positive copy would be possible. Again the cDNA was not synthesized in-situ on the array; it was incubated as a prepared mix on the primary surface. An additional disadvantage is the holed mask. It has to be exactly in the format and especially in the grid of the spots of the primary DNA microarray and it has to be positioned exactly. Given the length of a microscope glass slide of 75 mm and a spot size of 100 µm the mask has to be placed under a tilt of less than 0.08° and for a new format of microarray a new holed mask has to be made.

In the same year, 2006, Y. Kim et al [15] presented an advanced copying technology for DNA-to-DNA copies of microarrays. First a primary DNA microarray was printed onto a substrate. Then a DNA-Polymerase was used directly on this surface to generate the cDNA. The primer for the Polymerase already contained a biotin-modification. After the amplification by the Polymerase each spot contained its according cDNA labeled with biotin. Then a second surface coated with streptavidin is brought in strong contact to the primary surface. Due to the close proximity the biotin binds to the Streptavidin. By heating, the binding strength between DNA and cDNA is lowered and both surfaces are split from each other. This leads to a negative copy remaining on the secondary surface.

The advantage of this setup is that the DNA is amplified in-situ direct on the microarray, so no pre-synthesis is needed. Also the transfer is, due to the specific binding between biotin and Streptavidin, highly specific. Disadvantages are the close conformal contact between the surfaces leading to mechanical damage of the arrays as well as only negative copies could be obtained. The process could not be repeated with the Streptavidin-biotin binding system, so other binding pairs have to be evaluated, if a positive copy should be maintained.

Conclusion on the Prior Art with Respect to Array Copying

For the DNA-to-DNA copy only Y. Kim et al [15] concluded to use a enzymatic DNA amplification system as beneficial for the replication process. This will inherently deliver the "DNA ink" to make the copy, independently of the DNA sequence, whilst S. Kim et al [14] recognized to circumvent the close conformal contact between surface, to prevent mechanical abrasion as well as to transfer the DNA within the liquid. None of them realized a positive copy of the initial DNA.

For the DNA-to-Protein copy there are two key generation systems (PISA and NAPPA), which allow to convert a DNA-microarray into a protein-microarray. However both systems use and consume the DNA-microarray. Taussig et al [1] improved his own PISA-system to the DAPA-layout, which allows to make several protein-microarray copies without using up the original template DNA-microarray. But the system is inherently undefined for its starting conditions, due to the fact that the assembly and the reaction start are coupled. This limits reproducibility and due to hard contact between different surfaces, again the arrays suffer in quality and reproducibility by mechanical abrasion.

SUMMARY OF THE INVENTION

It was an objective of the invention to provide a device and a method for the generation of molecular microarrays, which overcomes the problems known in the prior art. A further object of the invention was to provide a unified approach to enable, in the same setup (device, method and system), DNA, RNA and protein-microarrays to be produced via an identical work flow. In light of the prior art, the technical problem underlying the present invention can be seen as the provision of an improved or alternative device and method for enabling fast, controllable and reproducible transmission of molecules, such as protein, DNA or RNA, from a template to a capture surface. A further technical problem was to provide complete decoupling of assembly of the template and capture array surfaces from initiation of the reaction leading to production of output molecules and transfer of said output molecules, preferably under defined conditions and with a minimum of mechanical stress to the original template array.

This problem is solved by the features of the independent claims. Preferred embodiments of the present invention are provided by the dependent claims.

The various aspects of the present invention, such as the method, array, device and system described herein, represent a unified invention, as all are defined by novel and inventive features in light of the cited prior art. It was at the date of filing unknown that molecular microarrays could be produced via production and transfer of an output molecule, such as protein, DNA or RNA, from a template surface to a capture microarray surface without the assistance of a membrane layer positioned between the two surfaces. The absence of such a membrane layer enables the decoupling of the reaction start from the assembly of the device, providing various advantages, as described herein. The use of a microfluidic gap or incubation chamber between the template and capture surfaces was thought previously to be unsuited for the precise molecular transfer described herein. It was therefore surprising, that the transfer of output molecule can occur reliably in a small volume of fluid without the need for membrane support. All aspects of the invention are based on and make use of this newly developed principle, therefore providing a unified concept to the various aspects of the invention, such as the method, device, array and system.

Therefore, an object of the invention is to provide a method for producing a molecular microarray, comprising
  a) providing a first support surface (template surface), that exhibits one or more template molecules immobilised on its surface, and an opposing second support surface (capture or microarray surface),
  b) production of an output molecule from said template molecule via a cell-free enzymatic and/or chemical reaction system,
  c) transfer of said output molecule to a second support surface via fluid between the first and second support surface, with a correlation between the location of the template molecules on the first support surface and the deposition of the corresponding output molecules on the second support surface,
  characterised in that
  d) assembly of the support surfaces is decoupled from initiation of step b), whereby initiation of step b) is prevented by removable restrictive means.

In one embodiment the method of the present invention is characterised in that the removable restrictive means are
  a spatial separation between the first support surface and the second support surface, preventing direct physical contact of the two surfaces,
  a chemical or energetic environment that blocks the cell-free enzymatic and/or chemical reaction system, such as pH value and/or temperature that limits or blocks the activity of said system, and/or
  an internal or external force field, by means of an electric or magnetic field and/or potential that blocks the cell-free enzymatic reaction system.

Until now similar systems and methods for producing microarrays were limited by membrane layers between template and capture surfaces. It was surprising that assembly of the template and capture layers could be achieved without needing to induce/initiate the cell-free enzymatic and/or chemical reaction system. The addition of removable restrictive means to the method as described above allows assembly to reliably occur without risk of damage to the components or immediate initiation of microarray production, which is for example a significant disadvantage when selling ready-made kits or devices comprising already installed template and capture surfaces. Such ready-made kits with installed template and/or capture surfaces are furthermore subject matter of the invention.

In a preferred embodiment the method of the present invention is characterised in that the spatial separation between the support surfaces is a microfluidic incubation chamber (microfluidic gap) formed between opposing separated first and second support surfaces.

In a preferred embodiment the method of the present invention is characterised in that the microfluidic incubation chamber does not comprise of a membrane positioned between the first and second support surfaces.

It was at the date of filing unknown that molecular microarrays could be produced via production and transfer of an output molecule, such as protein, DNA or RNA, from a template surface to a capture microarray surface without the assistance of a membrane layer positioned between the two surfaces. The use of a microfluidic gap or incubation chamber between the template and capture surfaces was thought previously to be unsuited for the precise molecular transfer described herein. It was therefore surprising, that the transfer of output molecule can occur reliably in a small volume of fluid without the need for membrane support.

The term microfluidic refers to fluids distributed in small dimensions, such as sub-millimeter scale, as small as a few nanometers, to hundreds or nanometers, to a few micrometers or hundreds of micrometers. The resulting volumes of liquid are very small, typically dealing in microliters, nanoliters, picoliters or femtoliters, and allow very sparing use of enzymatic reagents in producing molecular arrays.

In a preferred embodiment the method of the present invention is characterised in that removal of the restrictive means occurs by introduction of cell-free enzymatic and/or chemical reaction system into the microfluidic incubation chamber, thereby inducing production of said output molecule and enabling transfer of said output molecule to said second support surface.

In a preferred embodiment the method of the present invention is characterised in that the first support surface and second support surface are held in a fixed position, opposing one another, preferably via a mechanical tension or spring system, before initiation of the production of said output molecule via a cell-free enzymatic and/or chemical reaction system according to step b) of claim 1.

The previous embodiment clarifies the substantial difference between the present invention and prior methods, such as DAPA, in which positioning of the support surfaces was impossible without method initiation.

In one embodiment the method of the present invention is characterised in that the method can be repeated using a single first support surface multiple times for production of multiple microarrays.

The removal of the membrane feature and replacement with the microfluidic system has enabled single template surfaces, preferably with DNA libraries spotted on their surface, to be used multiple times for the production of molecular arrays. Although this seems a minor improvement, the avoidance of having to regenerate DNA arrays as templates saves enormous costs and effort, especially in regard to large-scale projects where protein-protein binding assays or other molecular interactions studies with hundreds or thousands of arrays need to be processed. The present method therefore enables an enormous saving of cost and provides greater reproducibility for high-throughput approaches.

In one embodiment the method of the present invention is characterised in that the removable restrictive means relate to chemical blocking agents present on the first and/or second support surfaces, that block the cell-free enzymatic and/or chemical reaction system and/or block binding of the output molecule to the second support surface, which can be modified and/or removed as required to initiate the method, or depletion or restriction of essential chemical compounds for the cell-free enzymatic reaction system.

In one embodiment the method of the present invention is characterised in that the blocking of the cell-free enzymatic and/or chemical reaction system relates to use of light cleavable chemical substituents attached to essential —OH groups of reaction components, whereby treatment with light releases the reaction component and enables reaction initiation, or binding and/or capture of essential reaction components to either the first or second surface, such as ATP, essential salts or coenzymes such as vitamins or metal ions, so that reaction initiation occurs only upon filling or an external impulse.

In one embodiment the method of the present invention is characterised in that the removable restrictive means relate to molecular switching of molecules from active to inactive state, or from inactive to active state, by pH-change, inducing a functional change in pH-sensitive molecules, for example through light treatment of a surface coated with titanium dioxide leading to generation of H+ ions and subsequent pH change, change in static and/or dynamic electrical and/or magnetic fields, inducing a change in charged, dielectric or magnetic molecules or surface properties, change in temperature, inducing a change of the molecular structure or dynamics, such as reduced temperature leading to inactivity of a DNA or RNA polymerase, whereby upon warming reaction initiation occurs, illumination, inducing a change of blocked, photo-sensitive or caged molecules by light-induced reactions, such as use of light cleavable chemical substituents attached to essential reaction components, whereby treatment with light releases the reaction component and enables reaction initiation, and/or release of caged compounds, such as light induced release of caged biotin or other molecules, or a combination thereof.

In one embodiment the method of the present invention is characterised in that the template molecule is a nucleic acid or nucleic acid-like molecule, such as DNA, RNA, genomic DNA, cloned DNA fragments, plasmid DNA, cDNA or cDNA libraries, PCR products, synthetic DNA or DNA oligonucleotides, mRNA or synthetic RNA.

In one embodiment the method of the present invention is characterised in that the cell-free enzymatic reaction system is a DNA-polymerase or a DNA-amplificating enzyme or enzyme system, a RNA-polymerase or a RNA-amplificating enzyme or enzyme system, a reverse transcriptase or a RNA-to-DNA transcribing enzyme or enzyme system, a protein synthesizing system or a cell free expression mix, such as an enzyme mix required for transcription of DNA to RNA and translation of RNA to protein, such as cell-free lysate selected from a prokaryotic or eukaryotic system, such as E. coli, bacterial origin, rabbit reticulocyte, insect origin, human and wheatgerm.

In one embodiment the method of the present invention is characterised in that the cell-free enzymatic reaction system is a DNA-polymerase, the output molecules are DNA and a DNA microarray is generated on the second support surface.

In one embodiment the method of the present invention is characterised in that the cell-free enzymatic reaction system is an RNA-polymerase, the output molecules are RNA and a RNA microarray is generated on the second support surface.

In one embodiment the method of the present invention is characterised in that the cell-free enzymatic reaction system is a reverse transcriptase, the output molecules are DNA and a DNA microarray is generated on the second support surface.

In one embodiment the method of the present invention is characterised in that the cell-free enzymatic reaction system is a protein synthesizing system or a cell free expression mix, such as an enzyme mix required for transcription of DNA to RNA and translation of RNA to protein, the output molecules are protein and a protein microarray is generated on the second support surface.

The invention further relates to a molecular array produced by the method as described herein.

The invention further relates to a device for the production of a molecular microarray, preferably for carrying out the method according to any one of the preceding claims, comprising a) a first support surface (template surface) that exhibits one or more template molecules immobilised on its surface, b) a second support surface (capture or microarray surface) assembled with said first support surface, c) whereby a microfluidic incubation chamber (microfluidic gap) is formed between physically separated and opposing first and second support surfaces for a cell-free enzymatic and/or chemical reaction system, thereby decoupling assembly of the support surfaces from initiation of cell-free enzymatic and/or chemical reaction system, d) a fluid inlet and/or outlet into the incubation chamber, e) means for holding the two opposing support surfaces in a fixed position, and f) means for maintaining the incubation chamber as a space between the two opposing support surfaces.

The device of the present invention exhibits all those inventive features of the above described method that provide a novel and inventive development over the prior art. The device allows the decoupling of assembly and initiation of the cell-free enzymatic and/or chemical reaction system via the microfluidic chamber formed between the template and capture surfaces. The surfaces are held in physical separation, so that upon filling with reaction components the initiation of the method is enabled. The construction of such a device is a surprising development in the prior art, considering that microfluidics were not considered appropriate to provide sufficient resolution for the output molecule transfer, It was surprising, that for example protein production from a DNA template lead to comparable if not improved transfer with the device of the present invention in comparison to the DAPA system using a membrane. The device disclosed herein also lead to a significant reduction in time for the transfer, with comparable, if not improved, accuracy and resolution of protein production and transfer in the microfluidic chamber.

In a preferred embodiment the device of the present invention is characterised in that the microfluidic incubation chamber does not comprise of a membrane positioned between the first and second support surfaces.

In one embodiment the device of the present invention is characterised in that the means for maintaining the incubation chamber as a space between the two opposing support surfaces is a spacer between the first and second support surfaces.

In one embodiment the device of the present invention is characterised in that the means for maintaining the incubation chamber as a space between the two opposing support surfaces is one or more three-dimensionally structured (3D) flow cells, preferably of synthetic polymers, such as thin film polymer materials or Polydimethylsiloxane (PDMS). The term synthetic polymer refers to any synthetic polymer or other material that could be applied or is suitable for construction of flow cells.

In one embodiment the device of the present invention is characterised in that the fluid inlet and/or outlet is suitable for the cell-free enzymatic and/or chemical reaction system to be pumped or pipetted into and/or out of the incubation chamber.

In one embodiment the device of the present invention is characterised in that the template molecule is any of the molecules selected from a nucleic acid or nucleic acid-like molecule, such as DNA, RNA, genomic DNA, cloned DNA fragments, plasmid DNA, cDNA or cDNA libraries, PCR products, synthetic DNA or DNA oligonucleotides, mRNA or synthetic RNA.

In one embodiment the device of the present invention is characterised in that the spatial separation between the support surfaces is less than 100 micrometer in height, preferably less than 80 micrometer, such as 65 micrometer, preferably less than 60 micrometer, or more preferably less than 40 micrometer, such as 20 micrometer and less.

In one embodiment the device of the present invention is characterised in that said first and second support surfaces are glass, plastic, nylon or other type of natural or synthetic polymer or membrane, for example Polydimethylsiloxane (PDMS).

In one embodiment the device of the present invention is characterised in that the first and/or second support surface is a standard glass slide(s) suitable for use in microscopy, such as with dimensions of 76×26×1 $mm^3$. Small deviations in these dimensions also fall within the scope of the invention, as common knowledge for one skilled in the art.

In one embodiment the device of the present invention is characterised in that the device is of handheld size, preferably of 60-140 mm, 80-120 mm or more preferably of 105 mm in length, and preferably of 30-90 mm, 40-80 mm, or more preferably of 60 mm in width.

In one embodiment the device of the present invention is characterised in that the means for holding the two opposing support surfaces in a fixed position relate to mounting brackets (holders), positioned either as upper, lower, or side brackets, positioned in relation to the two support surfaces.

In one embodiment the device of the present invention is characterised in that either the support surfaces or the mounting brackets (holders) are held in place by mechanical tension, magnetism, a spring system, guiding rails for the surfaces thereby holding the two support surfaces in a fixed position.

In one embodiment the device of the present invention is characterised in that said second support surface is pre-coated with an immobilisation agent configured to covalently or non-covalently attach the output molecule to the surface.

In one embodiment the device of the present invention is characterised in that the immobilisation agent is a protein immobilisation agent, such as an antibody, configured to covalently or non-covalently attach to the expressed protein, a polyhistidine sequence such as hexahistidine, whereby said protein immobilisation agent is a chelating agent such as Ni-NTA, a peptide, domain or protein, whereby said protein immobilisation agent is an antibody specific to said tag and/or a biotin-binding molecule, such as avidin.

In one embodiment the device of the present invention is characterised in that the first support surface is
- a microarray of nucleic acids or nucleic acid-like molecules,
- a sequencing chip exhibiting nucleic acids,
- a spatially defined distribution of nucleic acids on a surface,
- a spatially defined distribution of nucleic acids on a bead array or a structured surface,
- a spatially defined distribution of liquid or solid material containing nucleic acids.

The invention furthermore relates to a system for the production of a molecular microarray, comprising
a) a first support surface (template surface) that exhibits one or more template molecules immobilised on its surface,
b) a second support surface (capture or microarray surface) assembled with said first support surface, whereby a microfluidic incubation chamber (microfluidic gap) is formed between physically separated and opposing first (template) and second (capture or microarray) support surfaces,
c) a fluid inlet and/or outlet into the incubation chamber,
d) means for holding the two opposing support surfaces in a fixed position, and
e) means for maintaining the incubation chamber as a space between the two opposing support surfaces,
whereby
f) a microarray is formed by production of an output molecule from the template molecule and transfer of said output molecule to the surface of the second support surface (capture or microarray surface) after introduction of cell-free enzymatic and/or chemical reaction system into the microfluidic incubation chamber, thereby inducing production and transfer of said output molecule to said second support surface.

DETAILED DESCRIPTION OF THE INVENTION

The device and method as described herein remove several of the disadvantages of the state of the art and are capable of being used preferably for the manufacture of DNA, RNA and protein arrays.

The invention represents an improvement of the "DAPA-system" (DNA array to protein array system) for generating protein array copies from a DNA-microarray original [1]. The invention allows in the same manner to copy an original DNA array into a duplicate DNA array (by using a DNA-polymerase or any other DNA-replication or amplification enzyme), into an RNA array (by using RNA-polymerase) or into a protein array (by using a similar enzymatic system to the DAPA system). The invention enables the copying of original RNA arrays into DNA arrays (by using Reverse Transcriptase) or into protein arrays (by using a similar enzymatic system to the DAPA system).

The invention relates in particular to the provision of a unique structure and layout of the device and a novel process. Firstly, the first support surfaces, containing the original microarray, and the second surface, that subsequently "captures" the copy, are separated by a thin so-called microfluidic gap. This microfluidic gap contains preferably air before initiation of the method, which prevents the start of the reaction, and upon filling with an amplification mix the method is initiated. As such this layout bears two advantages over the state of the art. Firstly, there is no physical contact between surfaces, which prevents mechanical stress or abrasion. Secondly, it allows the assembly of the device without starting the reaction. As such the assembly and the reaction start are decoupled, which allows more detailed process guidance, for example parallel reactions can be simultaneously started with more ease than according to the methods and devices of the prior art.

Depending on different layouts the first support surface (template surface, DNA microarray) and/or the second support surface (capture or microarray surface, protein microarray copy) could also contain a microstructure to either produce the microfluidic gap itself (completely or partially or assisting it) or a spacer could be laid between the primary and the secondary surface to produce the microfluidic gap. Such a structure on one surface or a spacer will allow the application of at least one microarray in the format of a standard microscope slide.

In addition the microfluidic structures may exhibit contact in highly defined positions on the DNA array as well as on the capture surface and define as such micro-cavities restricting the diffusion in a defined way. With such microfluidic guidance the diffusion of the output molecules can also be guided and the creation of more highly defined, smaller and sharper structures compared to the DAPA system can be realized.

A further advantage of the present invention compared to those known in the art, such as DAPA, is the reduction in the amount and/or volume of cell-free enzymatic and/or chemical reaction system required to carry out the method. Soaking a membrane with cell-free enzymatic reaction mix (as in DAPA) requires large volumes of said mix and is therefore cost intensive. The small volumes of the reaction chamber of the device of the present invention enables a significant reduction in the amount of disposable reaction mix required and therefore leads to significant cost reduction.

FIGURES

The figures show various applications of the method and device of the present invention.

In the preferred layout the assembly is realized by clamping the spacer between the arrays (first and second surfaces).

Depending on the enzymatic system filled into the microfluidic gap it is possible to generate DNA- or RNA-microarrays instead of protein-microarrays. With a corresponding enzymatic system like a nucleic acid polymerase it is possible to generate DNA or RNA derived from the nucleic acids on the primary array.

FIG. 1: Layout for DAPA, Design 1 and Design 2 of the present invention (side view and top view), showing various positions of the inlet and/or outlet in relation to the spacer and support surfaces.

Figure 2:
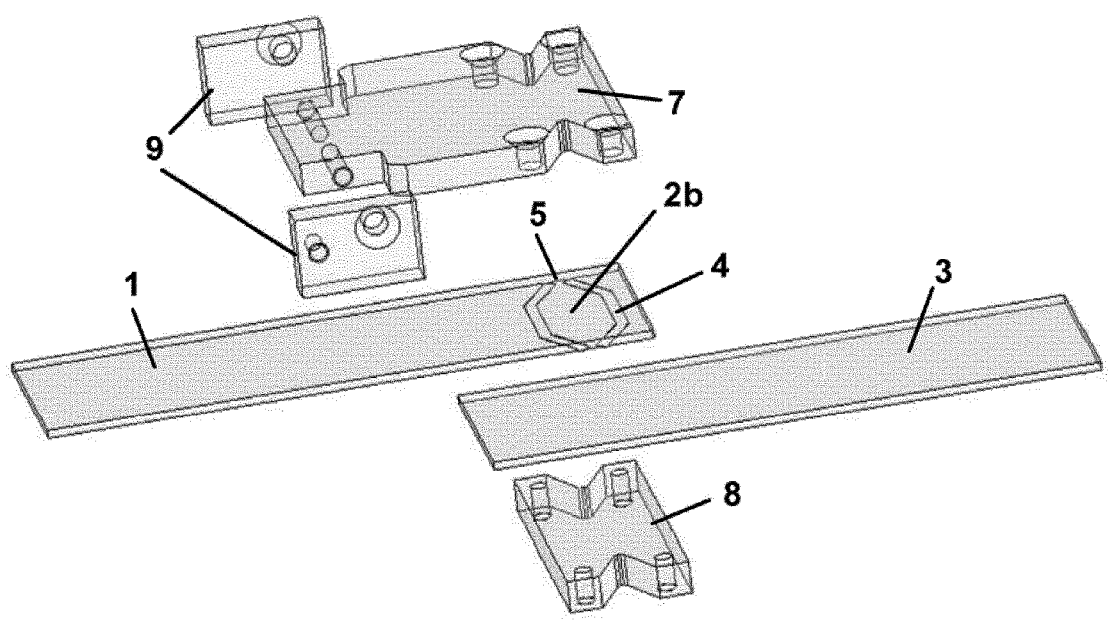

FIG. 2: Design 1 for a handheld device (perspective view), including upper, lower and side mounting brackets (holders), in addition to a spacer between the first support surface and the second support surface.

Figure 3:
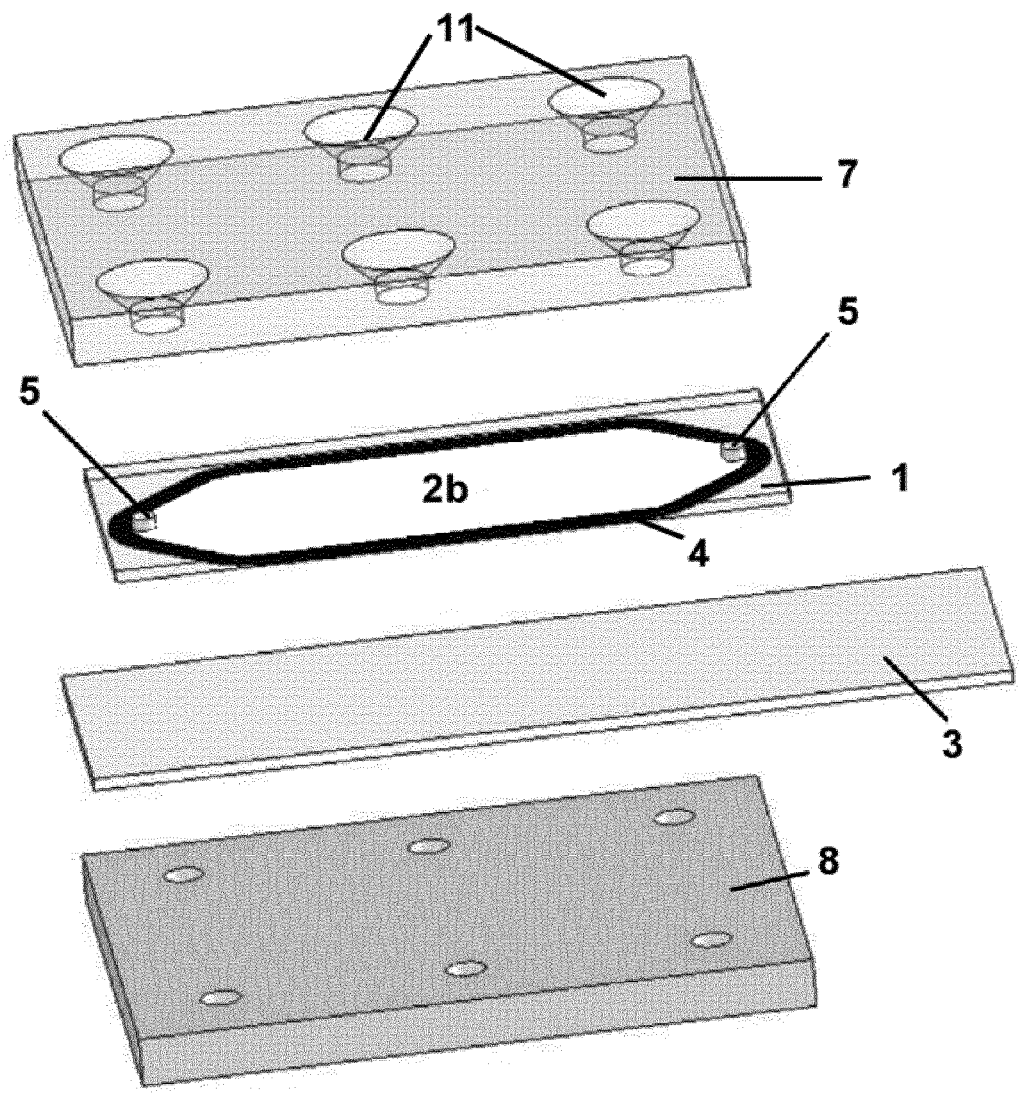

FIG. 3: Design 2 for a handheld device (perspective view), including mounting brackets with screw elements.

Figure 4:
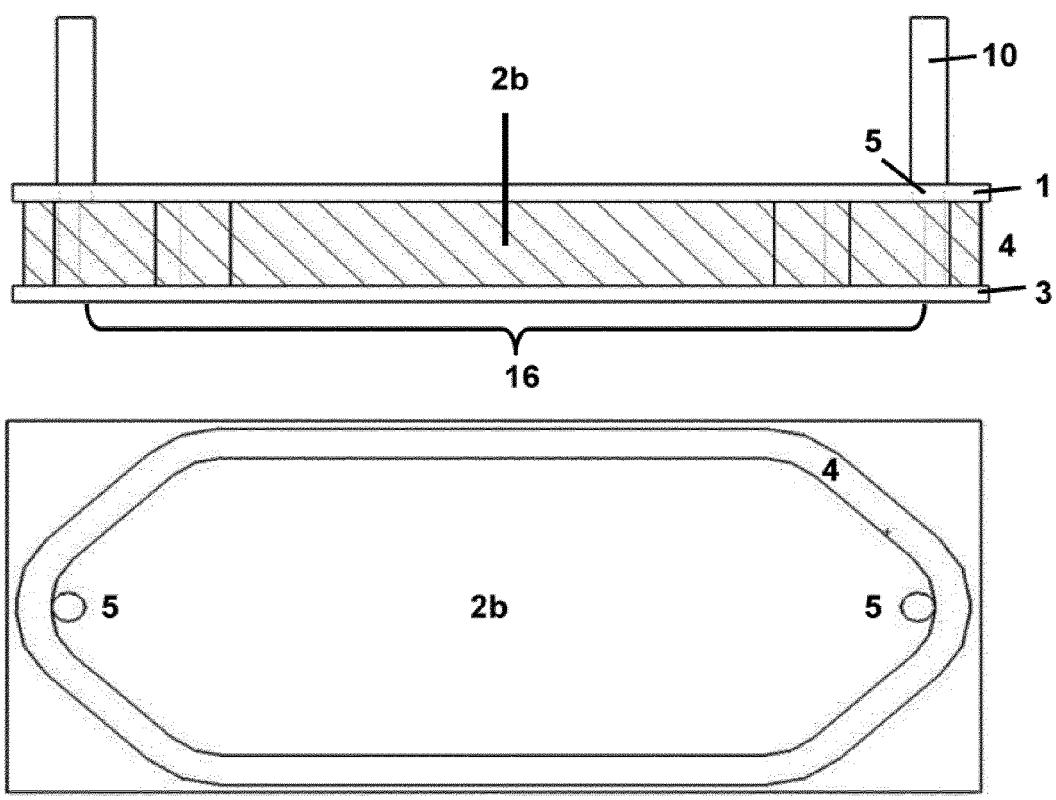

FIG. 4: Prototype 1 (side view and top view) showing closure/sealing elements, filling occurs through one surface.

Figure 5:
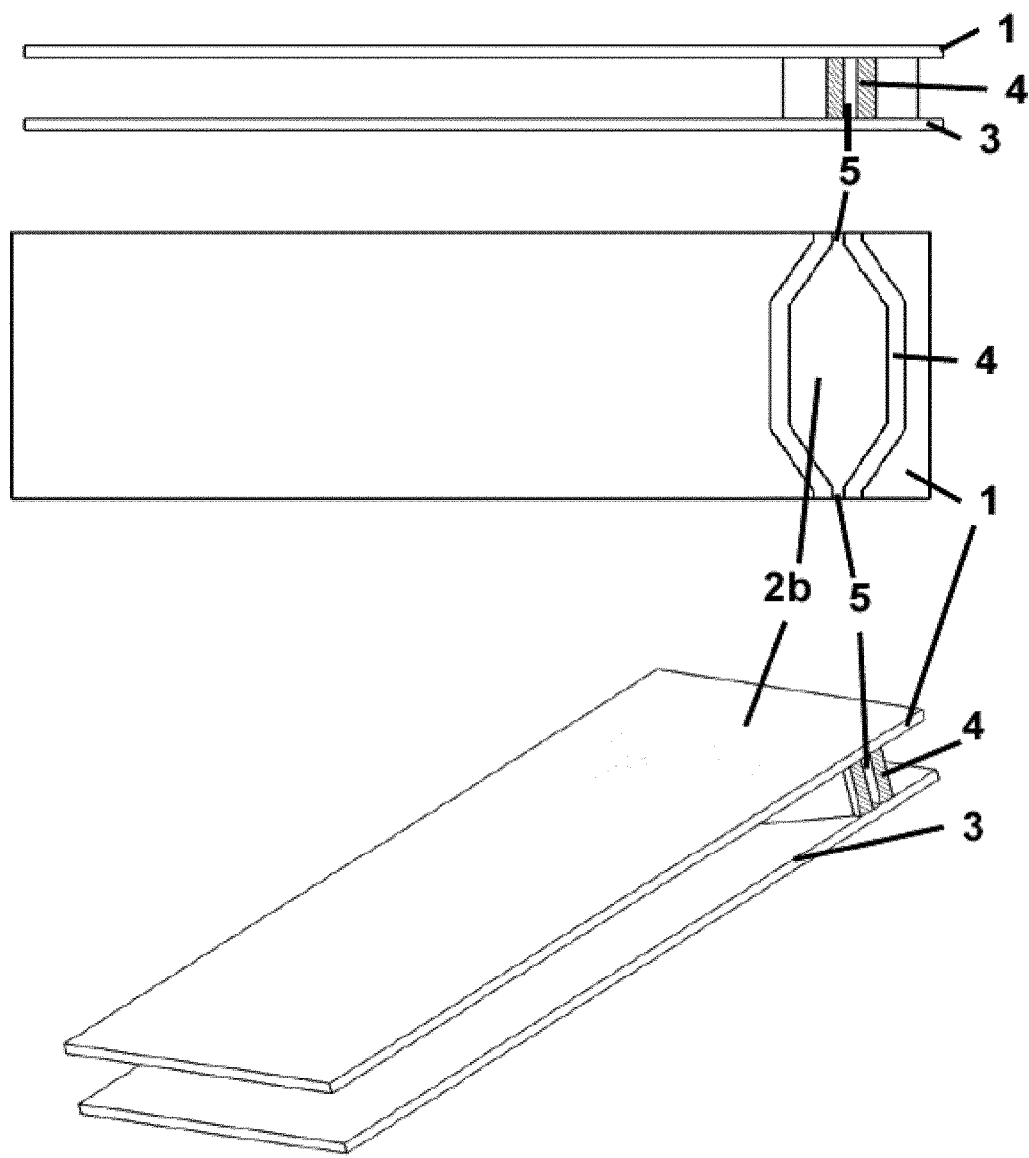

FIG. 5: Prototype 2 (side view, top view and perspective view), illustrating the construction and assembly of the support surfaces, spacer, chamber, inlet and/or outlet, whereby filling occurs through the side, between the surfaces.

Figure 6:
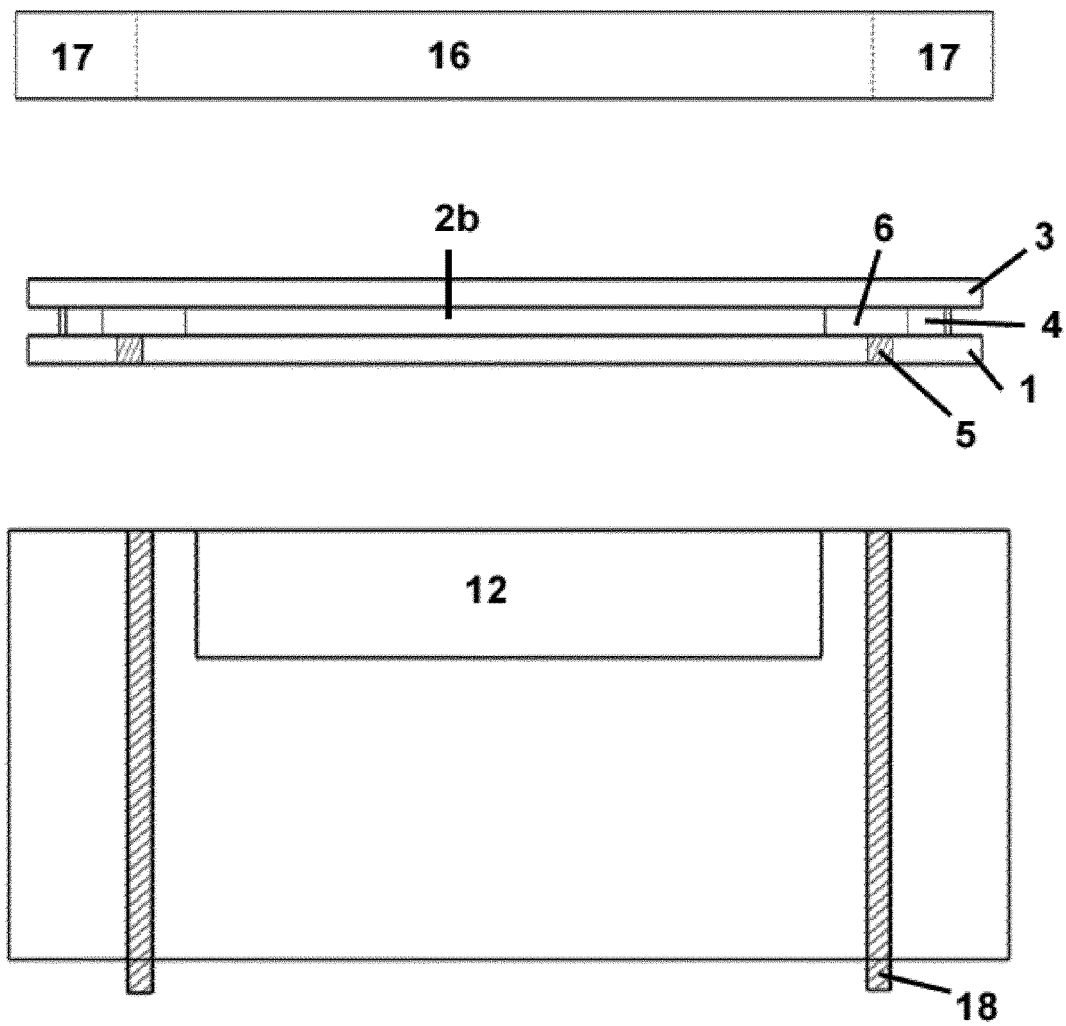

FIG. 6: Prototype 3 (side view), with Peltier-Element and viewing window; analogous to prototype 1, but compatible to an automated filling station or a holding cartridge.

Figure 7:
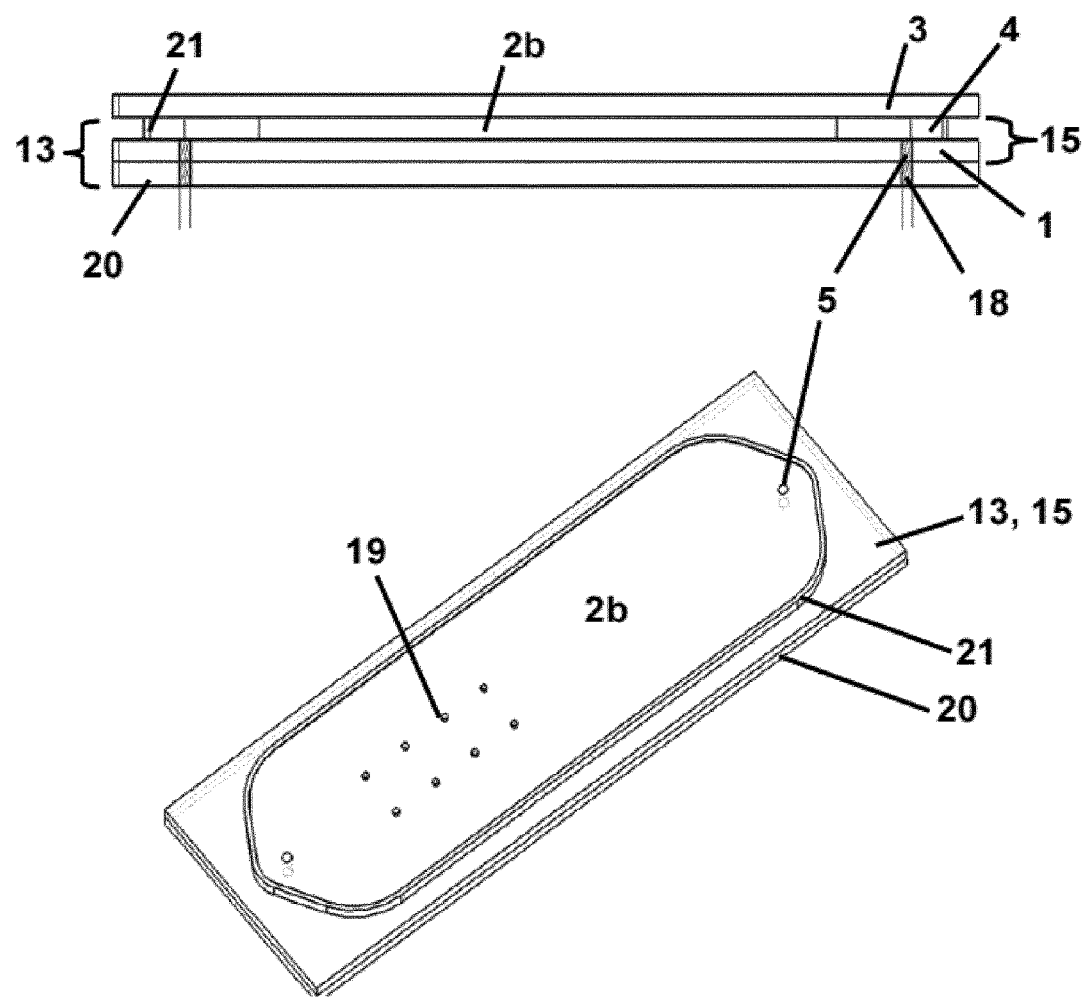

FIG. 7: Prototype 4 (side view and perspective view), showing a construction incorporating an integrated microstructure (as a combination of 1 and 4 (first support surface and spacer)), built of PDMS, whereby the DNA-array is shown and the device comprises a strengthened carrier of synthetic (plastic) material and a raised edge for sealing (sealing edge or border, which can also be attached via adhesive) of the device.

Figure 8:
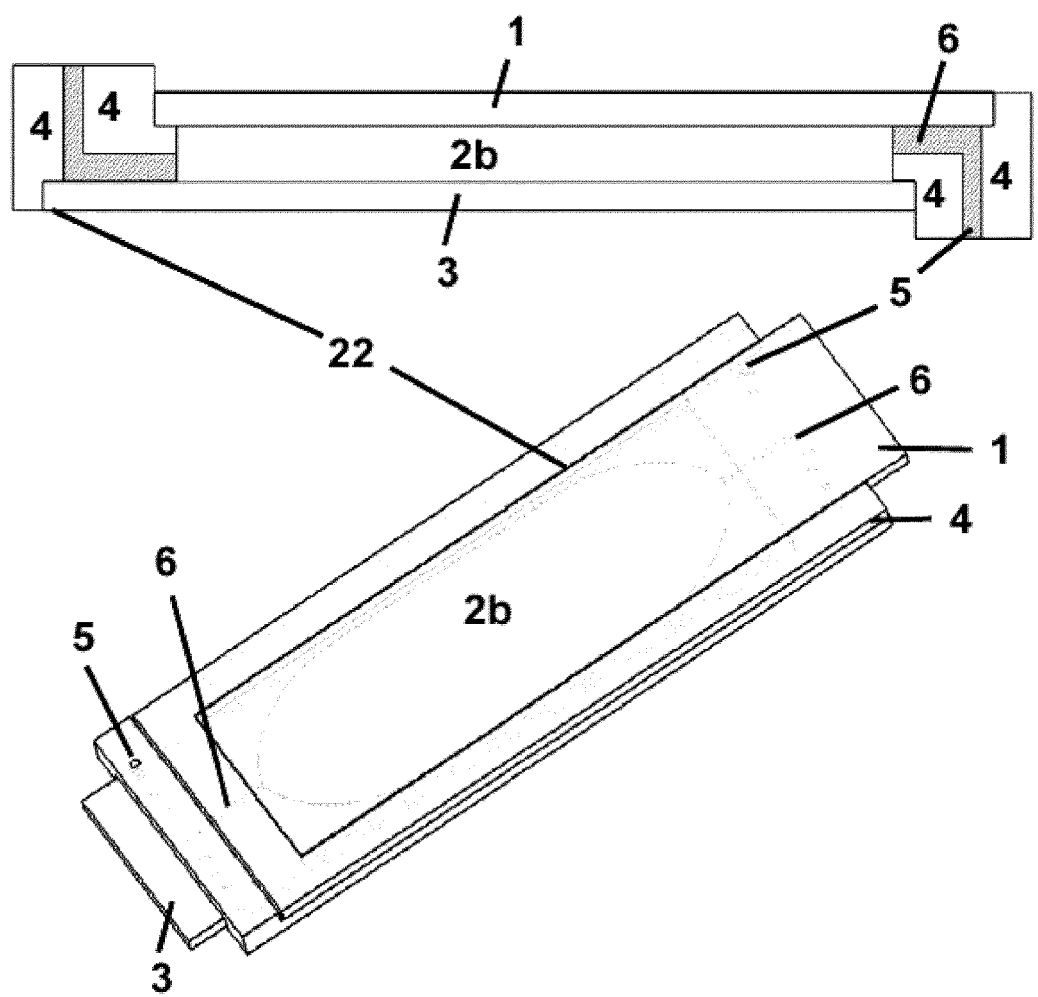

FIG. 8: Prototype 5 (side view and perspective view), showing an alternative arrangement of the inlet and/or outlet elements, in addition to insert frames, characterised by a microfluidic structured spacer.

Figure 9:
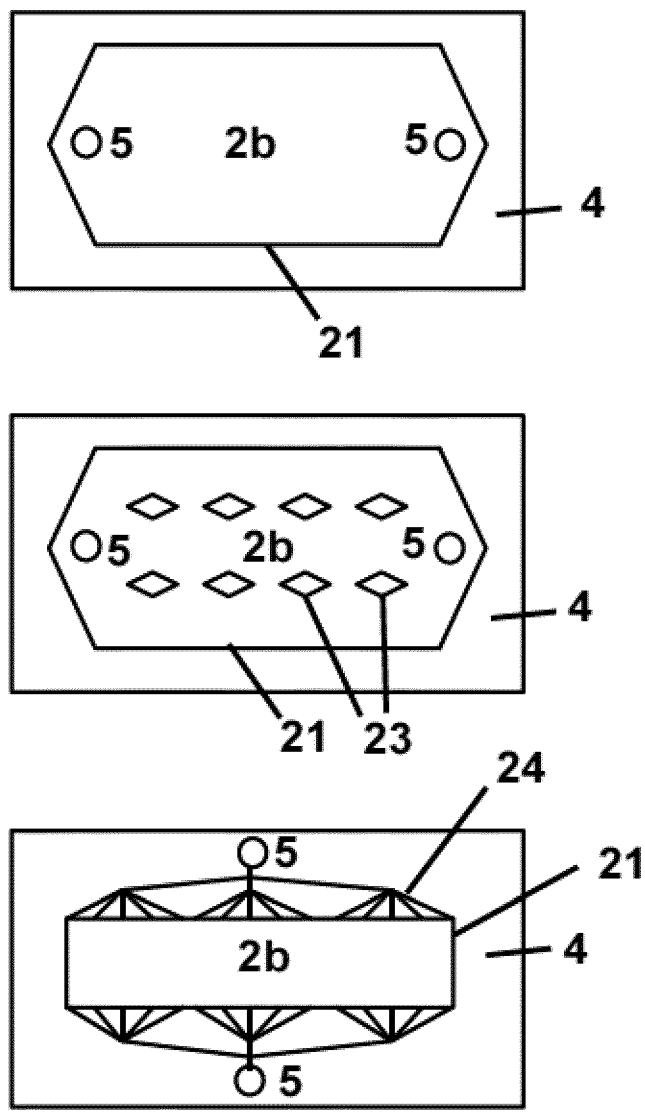

FIG. 9: Further designs of fluidic chambers (top view), showing alternative inlet and/or outlet arrangements, PDMS support, multiple-branched fluidic channels for homogenous and quick filling.

Figure 10:
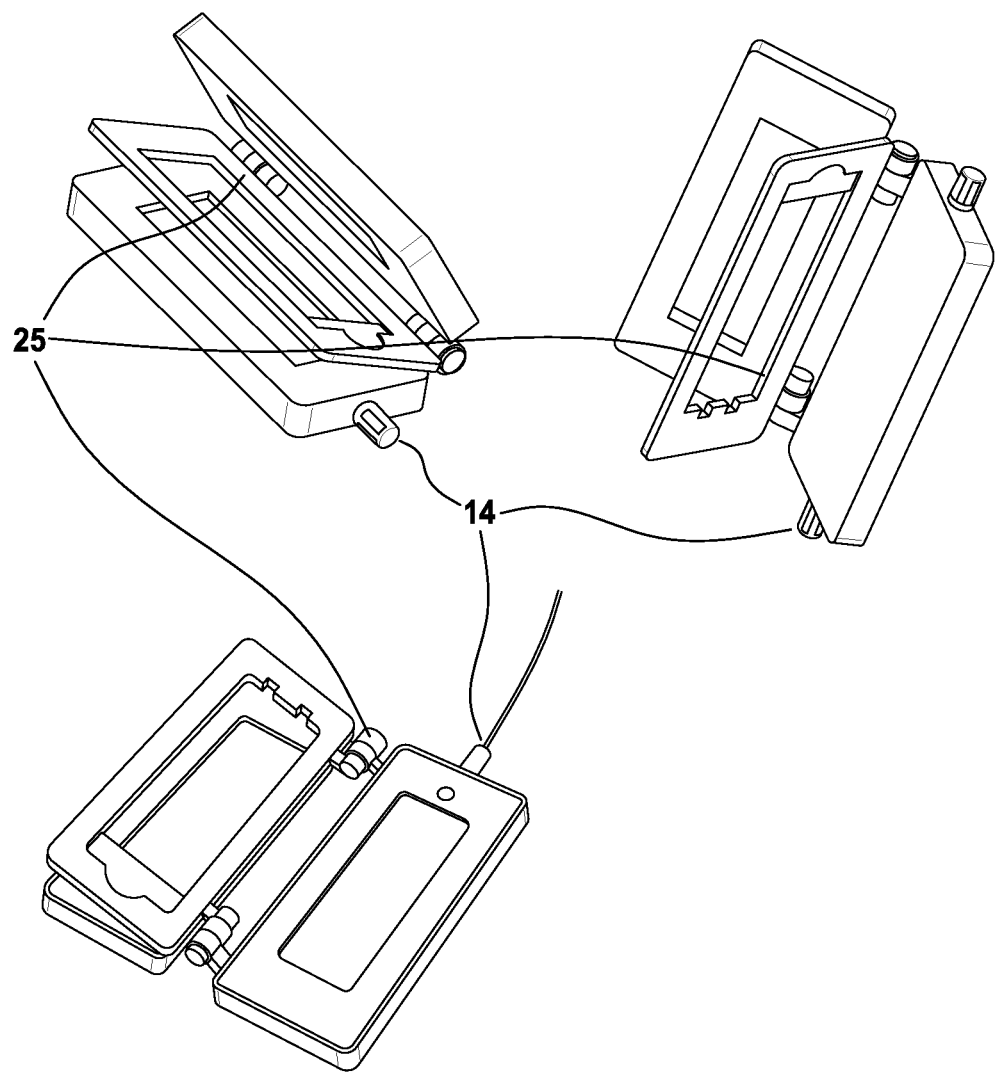

FIG. 10: Perspective view of a flow cell construction according to the device of the present invention, demonstrating a hinge construction for fixing of two support surfaces with microfluidic chamber, including a supply line for the inlet/outlet.

Figure 11:
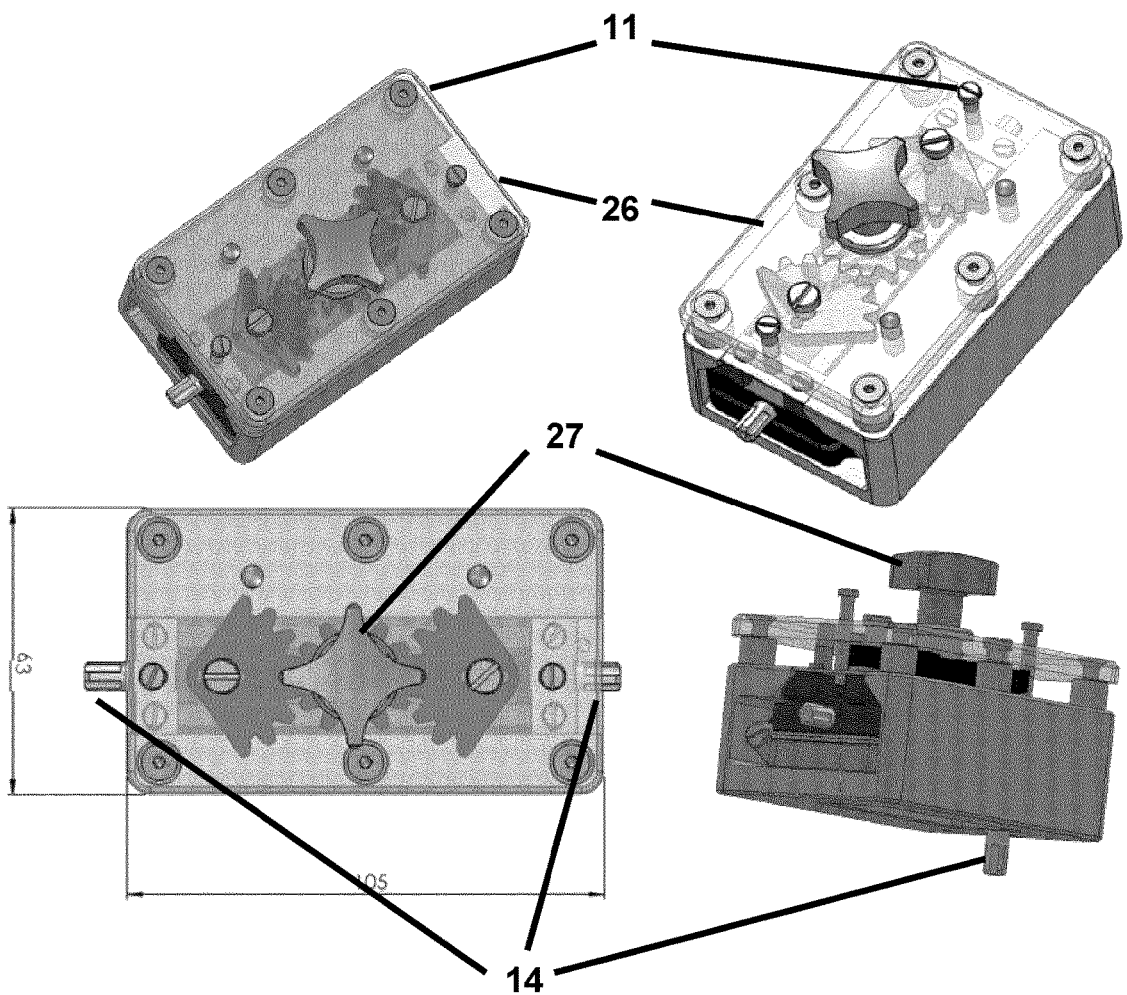

FIG. 11: Perspective and top view of a clamping construction used to fix the two support surfaces in a reliable and stable construction, and to seal the microfluidic chamber. A screw (mechanical tension) system is shown for assembly of upper, lower and side mounting brackets (holders), in addition to screw elements, whereby the integrated flow cell with supply line is also shown.

Figure 12:
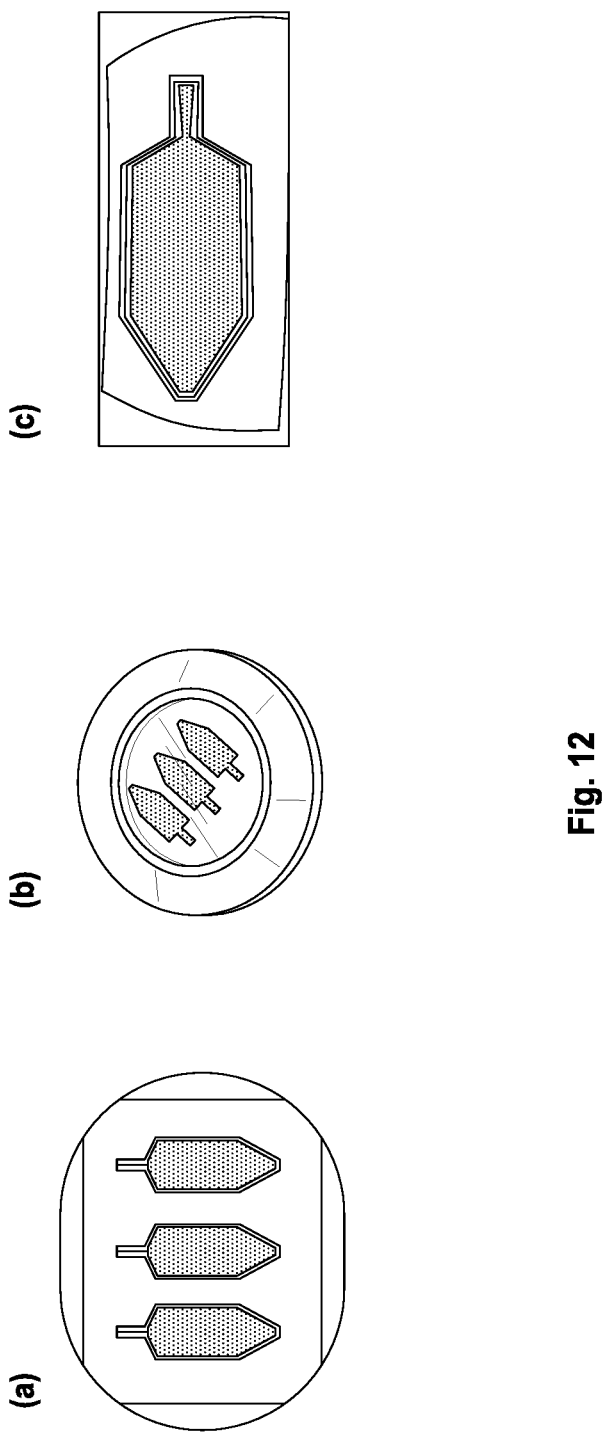

FIG. 12: Casting station equipment, (a) Wafer with TMMF micro-structuring; (b) wafer placed in centrifugal casting frame, (c) separated cast.

Figure 13:
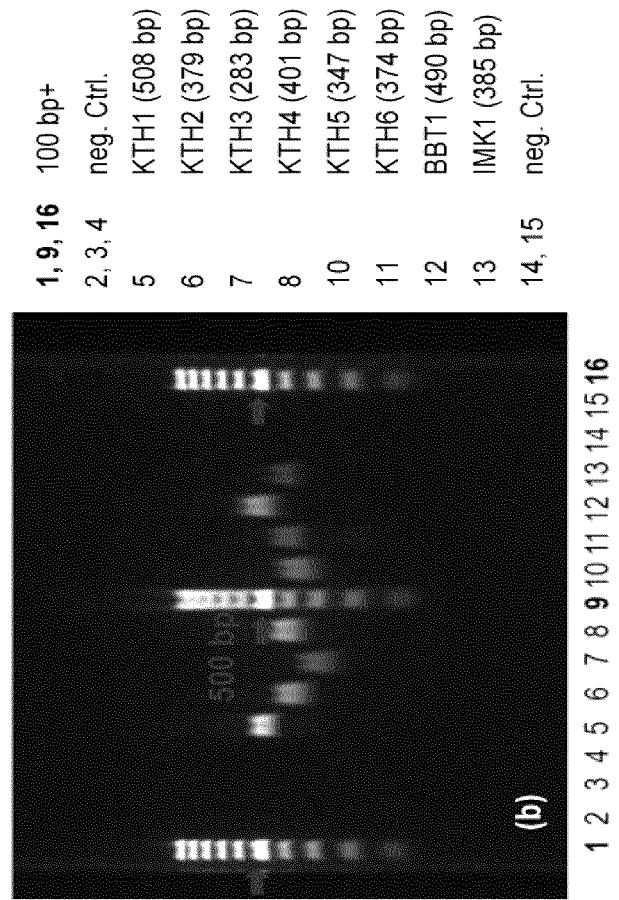
Figure 13:
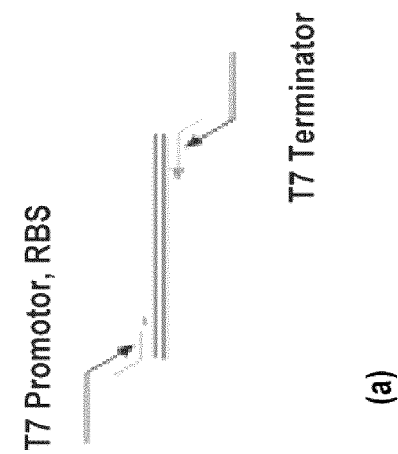

FIG. 13: Production of template nucleic acid for the first support surface, (a) Expression-ready DNA with the linear template kit from Qiagen; adapter primers with promoter sequences, RBS, start-/stop-codons and tags with overlapping sequences to the coding sequence are designated. (b) Gel-electrophoresis results from various expression-ready amplified DNA sequences. Lines 1, 9 and 16 show a ladder, lines 2, 3 and 4 represent negative controls, lines 5, 2, 8 and 10-14 represent various amplified coding sequences to be used as template DNA in a production of protein for the microarray.

Figure 14:
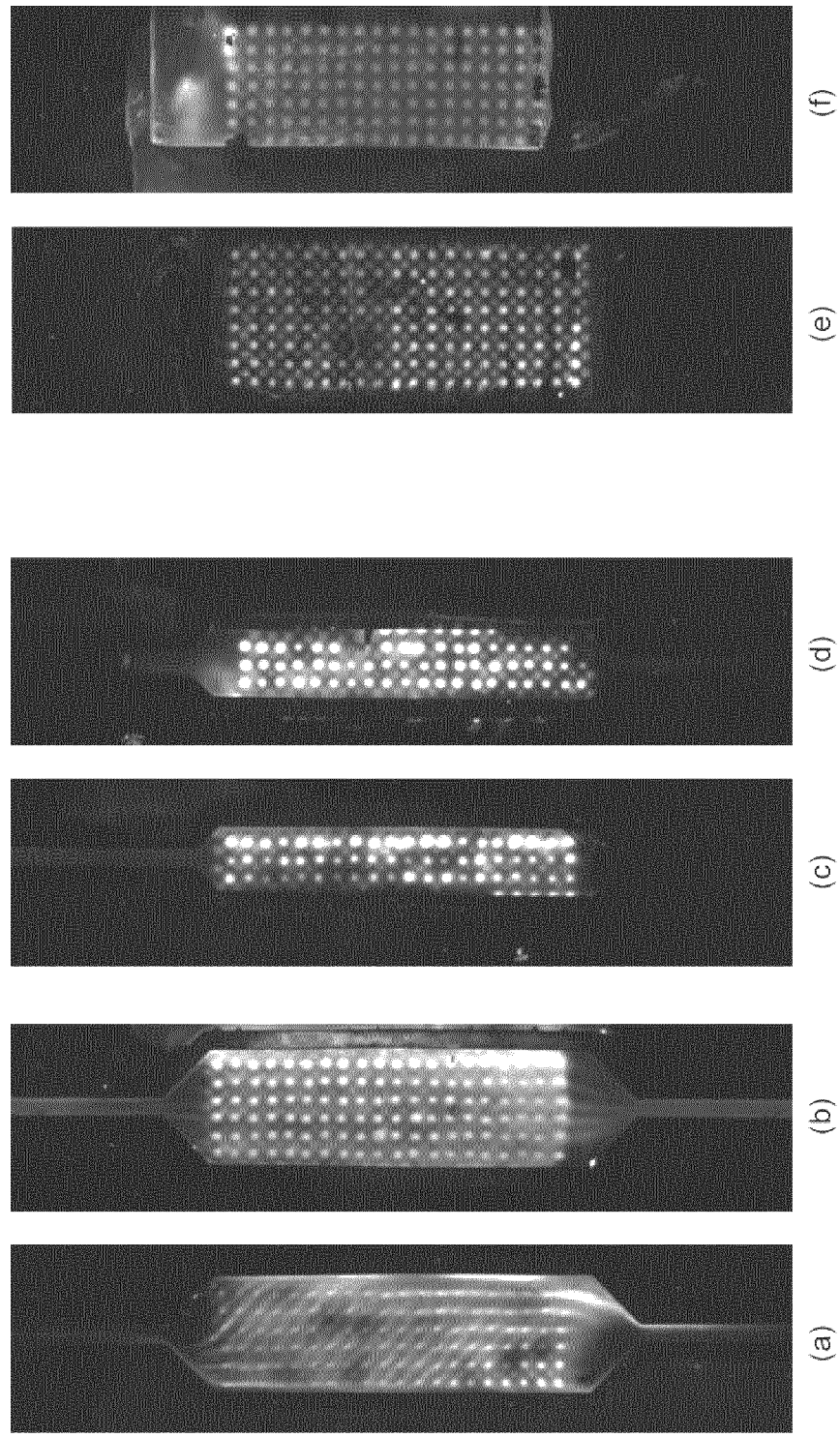

FIG. 14: Protein Arrays; Protein microarrays constructed from erDNA templates on PDMS flow cells (a–d) and epoxy glass slide (e+f), spotted via a gesim plotter, a handheld device (a–d) respectively in the original DAPA system (e+f). The cell-free expression was allowed to occur and subsequently the protein slides were labelled with Cy3 and Cy5 marked antibodies. The incubation times were as described in the text, at 37° C.

LEGEND FOR FIGURES

1 First support surface (template surface, carries one or more template molecules, such as nucleic acid)
2 Spatial separation between the first support surface and the second support surface, which preferably contains the cell-free enzymatic and/or chemical reaction system)
2a Membrane in DPA system
2b (Micro)fluidic incubation chamber (microfluidic gap)
3 Second support surface (capture or microarray surface), upon which the generated molecules are arrayed
4 Spacer between the first support surface and the second support surface, preventing direct physical contact of the two surfaces, which is laid between 1 and 3 or is integrated therein
5 Fluid inlet and/or outlet for filling, emptying and/or removing air
6 Microfluidic structures with micro-channels for fluid
7 Upper mounting bracket (holder)
8 Lower mounting bracket (holder)
9 Side mounting bracket (holder)
10 Closure for sealing and/or fastening
11 Screw element
12 Peltier-Element 13 Integrated microstructure as a combination of 1 and 4
14 Supply line
15 PDMS
16 Detection window
17 Clamp mounting (clamp holder) for fixing and/or locking the construction
18 Opening (drilled hole) with connecting hose
19 DNA-array
20 strengthened carrier of synthetic (plastic) material
21 raised edge for sealing (sealing edge or border)
22 Insert frames for sealing the surface
23 Support in PDMS to reduce risk of collapse of elastic PDMS
24 multiple-branched fluidic channels for homogenous and quick filling
25 Hinge
26 Mounting brackets
27 Means for inducing tension for sealing

EXAMPLES

Application Examples for DNA-to-Protein Copies

Prototypes have been constructed, which use instead of a membrane a microfluidic gap. This microfluidic gap can be filled with liquid via capillary forces. A 65 µm thick spacer enables in prototype 1 (Design 1) and 2 (Design 2), FIGS. 1 to 5 a defined distance between the first and second surface and a fluidic guidance of the cell free expression system whilst filling it in. This handheld device allows an easy and fast assembly and immobilized two microscope slides upon each other. After complete assembly the cell free expression mix can be injected via an orifice in a surface (Prototype 1) (Design 1) or at a small opening on the side of the spacer (Prototype 2) (Design 2). In comparison to the DAPA system and the laying of the membrane onto the surfaces, this realized handheld allows a defined reaction start, especially in respect to time of reaction start, as well as exact concentrations and volumes, which could not easily be determined within the membrane itself.

The reaction of protein replication as such does not start (as in the DAPA-systems) at assembly. It starts only if the cell free mix is injected. After the injection of the cell free mix the hand-held device is placed for 25 to 45 minutes in an incubator. Due to the devices' small weight and therefore low thermal capacity it reaches the desired reaction temperatures very quickly. After the incubation time the microarray surfaces are split from each other and the arrays are washed. Positive results have been achieved, showing comparable and in many cases improved arrays compared to DAPA arrays.

Prototype 3, FIG. 6, is a more complex cartridge, which can be integrated into a fluid-channeling device. It allows the thermal control of the fluid by a Peltier-element from one side. This allows the adjustment of any desired temperature or temperature profile. Additionally the side where the array (protein array) is generated is optically free, which means that it would be possible to monitor the protein-synthesis directly. The connected prototype can be filled via syringe pump, but also be emptied or washed.

Prototype 4, FIG. 7, is made from plastic like PDMS and is a structure onto which the DNA-microarray is spotted. The structure is framed by a thin (some tenths of micrometer high) frame, which encircles the whole reaction volume. It contains also the inlet and outlet lines for bringing the liquids in and out. The second surface (protein-microarray) is a microscope glass slide. By simple "clamping" onto the glass slide, the PDMS forms a microfluidic gap with this surface. Via the inlets and outlets the whole construct could be filled with liquid. Simple clamps fasten the arrays onto each other for the time of the reaction.

An identical, analogous layout could also be realized on the side of the second surface (protein-microarray). For this layout the PDMS has to be coated with a "protein-catcher-system" which could be preferably Nickel-NTA. The first surface (DNA microarray) will be a planar microscope slide.

Prototype 5, FIG. 8, is a PDMS structure, in which the second surface (protein microarray) as well as the first surface (DNA-microarray) is slid in via drawer-like mechanics. The PDMS and both glasses form together the microfluidic gap. This prototype is favorable due to the fact that the inlets and outlets are realized within the PDMS (leading to less chance of leakage) and both surfaces, the first (DNA-) and the second surface (protein-microarray) are realized in a standard microscope glass manner (no need of any special structured DNA- and/or protein-micorarray surfaces and therefore higher acceptance of the users in the laboratory).

FIG. 9 shows how the microfluidic could be realized with different layouts of the spacers. The spacer realizing the microfluidic gap brings in the additional advantages:

The first (DNA-) and second surface (protein-microarray) are separated by a microfluidic gap. There is no physical "hard" contact between the first and second surfaces, which prohibits mechanical stress, abrasion and scratches. This ensures a prolonged lifetime of the DNA-microarray and raises the quality of the protein-microarray copies.

The assembly of the device and the reaction start are decoupled. This allows an assembly at any time and a reaction start to any other later time point, which means a precise control of the reaction. These advantages in handling and process guidance (decoupling of assembly and reaction start) enable better more reproducible reaction conditions as well as on-demand reaction start. The easier assembly (compared to the DAPA system) can be realized by:
A microstructure in the first surface (DNA-Array),
a microstructure in the second surface (Protein-Array)
or a micro-structured spacer, which is laid between both surfaces (preferred application layout).

In case of the spacer, both surfaces can be realized in the format of a standard microscope slide and no additional sealing is needed. This is due to the fact that the spacer itself can be realized as sealing as soon as the surfaces are placed. This simple assembly allows a fast processing time. As such the time for the whole handling process from taking the DNA-microarray till getting the protein-microarray out was reduced from approx. 3 hours in the DAPA system to approx. 30 min with the handheld device of the present invention. This is a significant reduction of cycle time.

Advantages of the device and methods are: Replacement of the troublesome membrane by a microfluidic gap under retention of full functionality, protein-generation, respectively RNA-generation, respectively DNA-generation, and transfer of these molecules to the secondary surface, especially the transfer of proteins from the first DNA-microarray onto the second protein-microarray, decoupling of the assembly of the device and the reaction start.

The following disadvantages of the state of the art methods have been circumvented: Difficult handling of the soaked and thin membranes, buckling and air bubbles by laying the membrane onto a surface, direct reaction start at conformal contact between membrane and DNA-microarray, physical abrasion of the DNA-microarray due to mechanical contact between the DNA-microarray and the membrane.

Application Examples for DNA-to-DNA Copies

As used for the DNA-to-protein copying a corresponding setup can be realized for the DNA-to-DNA copy. Here the primary surface contains e.g. DNA with a known start and end sequence. The secondary surface will be homogeneously coated (or with specific structures) with primers identical start sequence of the DNA from the primary surface.

By filling in a DNA amplification mix like a DNA Polymerase with primers fitting to the known end of the DNA each DNA strand will be amplified into cDNA, as in [15]. By heating the system this cDNA will be released and will diffuse away from the spot of the primary array. By cooling the system the released cDNA will either stick back to the initial spot or will interact with the primers of the secondary surface. There the Polymerase will amplify the cDNA onto the primer of the secondary surface and will generate a covalently bound ccDNA, and as such an identical replicate of the initial DNA. Therefore a positive DNA-microarray copy of the primary DNA-microarray is made on the secondary surface.

Again, like in the DNA-to-protein copy, the microfluidic gap could be realized on the first and/or the second surface and/or a spacer which is positioned between both surfaces. All advantages from the DNA-to-protein copy apply here also. Additionally this layout allows that from a DNA-microarray a positive copy can be realized.

By selection of different primers on the second surface or in the enzymatic mix it is possible to generate a negative copy as well. This could be realized by exchange the surface primer on the second surface by the ending sequence and add only a small amount of end primer into solution, whilst the initial primer is added in larger amounts.

Application Examples for Other Copies

Depending on the used enzyme mix different copies can be realized:

DNA-to-DNA copy with any DNA amplification mix e.g. Recombinase-Polymerase-Amplification (RPA), isothermal DNA amplification systems or NASBA; RNA-to-DNA copy by reverse transcriptase followed by a ligation step to the secondary surface; DNA-to-RNA copy with any RNA amplification like e.g. RNA Polymerase.

Detailed Experimental Description of DNA-to-Protein Copies

The experimental examples provided herein related to the realization of a simple handheld device for the production of molecular microarrays from DNA microarrays, preferably the production of protein microarrays. Standard glass slides of 76×26×1 mm (respectively 75×25×1 mm, or other similar dimensions) are used as a carrier slide for DNA and protein microarrays. In one embodiment, the device for manufacturing a micro array comprises a hydrophobic spacer of approximately 40 micrometer thickness. This spacer comprises additionally of a microfluidic input and output and functions as an incubation chamber of very low height and volume. A finally tuned mechanical tension system additionally enables the quick exchange of slides used for the micro array, in addition to fixing the slides with reliable positioning. The incubation chamber can be manually filled via pipette or by commonly used pumping devices, whereby an enzyme mixture of cell free protein expression system is filled into the incubation chamber. Through this method protein microarrays can be manufactured in an uncomplicated quick and cost efficient method from DNA microarrays. Such protein microarrays particularly used for various kinds of protein analysis, for example protein-protein or protein-molecular interactions.

Protein microarray technology lags somewhat behind the technology established for DNA microarrays. One of the present problems in protein microarray production is the generation of full length proteins via recombinant expression, subsequent purification of recombinant protein and spotting upon the slide. As alternatives, various methods of chemical in-situ synthesis of peptides are available, however such methods are applicable primarily for short peptides and do not represent a realistic option for the production of full length protein microarrays.

The present experimental examples demonstrate the synthesis of full length protein microarrays from DNA microarrays via a robust microfluidic handheld device. In one embodiment, simple prototypes have been produced, which are demonstrated in FIGS. 1 a) and 1 b). The prototypes presented in the figures represent an improvement over the DAPA system known in the art. The bubble free filling of the incubation chamber, in addition to a tight seal of the chamber as well as providing a very low volume incubation chamber in order to minimize the lateral diffusion of a protein, has been further developed and is shown in the further examples.

Generation of the DNA Templates

In order to generate expression-ready DNA templates (erDNA) from any given nucleotide sequence, the linear template kit (LTK) from Qiagen has been applied. In a first PCR reaction (Polymerase Chain Reaction) primers constructed in house that exhibit overlapping regions of approximately twenty nucleotides to the coding DNA template, together with an adapter primer and detection sequence (for example Tags), are added to the original DNA strand via amplification. A second PCR reaction uses the product of the first PCR reaction as a template and extends the DNA product by means of the adapter primer (preferably also with added Tags such as His- or Strep-Tags, and sequences, which serve to allow binding of an RNA polymerase (T7 promoter) and a ribosome start side (RBS), in addition to a stop codon). With this kit DNA templates have been expression-ready amplified and the results are shown via a gel-electrophoresis experiment (FIG. 13). Sequence analysis of the PCR products confirms the desired results. These experiments demonstrate that via the LTK kit from Qiagen the DNA templates are extended with Tag sequences and are produced as expression-ready amplified cassettes.

Optimization of the Handheld Device

One of the embodiments of the invention relates to a microfluidic flow cell of very low volume and low height, which is based on use of a self-adhesive laser-cut polyester foil of approximately 100 micrometer thickness, which is attached via adhesive and is subsequently covered with another slide or cover slip. This particular form of the invention functions well, but also exhibits some other minor disadvantages. For example, the self-adhesive foil is suboptimal for incubation with the DNA templates, the foils are only available in certain thicknesses, the foils do not exhibit constant thicknesses, a three dimensional structure of the flow cell does not allow bubble free filling and the input and output require providing access through the slide, which can be difficult with glass, or through the side of the construction, which can be difficult to seal.

In order to overcome these minor disadvantages we have produced two further embodiments of the handheld device. The results of the two further devices offer improved filling of the device, absolutely reliable sealing and a simple usability. One of the variants uses exclusively the standard glass slides (76×25×1 mm$^3$) made of glass as a carrier structure, whereby the other embodiment is based on a three dimensional structured flow cell constructed from PDMS, in which the incubation chamber of the DNA array is immobilized.

Handheld Device with Structured PDMS Flow Cell

This embodiment comprises of a micro-structured PDMS slide (FIG. 7), which is functionalized for the immobilization of the DNA template molecules using PDITC. The PDMS slide is covered using a slide which is coated in Ni-NTA. The filling and/or emptying of the incubation chamber occurs via an opening in the PDMS slide. The master for the PDMS slides is milled to form the correct shape. A manual flow station allows the filling and emptying of the PDMS slides (FIG. 12).

To improve the bubble free filling and the seal ability the previously described structures were produced with a dry-film photo resist (TMMF, 30/45 micrometer thickness) or liquid lacquer SU-8 via photolithographic methods (FIG. 12a) e.g. spin-coating. The structured wafer was placed in a centrifugal pouring mould for pouring the PDMS slides (FIG. 12c).

Hand Held Device for Two Standard Glass Slides

The device according to this embodiment is intended for use with two standard glass slides for both microarrays. The filling of the incubation chamber occurs via a microfluidic channel, which is formed in a spacer with hydrophobic and elastic sealing surfaces. The spacer is made of a Teflon coated (typically 500 nm-15 micrometers) stainless steal plate of 25 micrometers thickness (an alternative is the direct use of a 30-80 micrometer thick Teflon foil). The slide needs to be pushed with strong force against the hydrophobic spacer, in order to produce a reliable seal. A device for fast substitution of the slides allows the quick and easy exchange of the various slides.

Cell-Free Protein Expression of Protein Arrays

In order to evaluate the two cell-free eukaryotic expression systems EasyXPress (Qiagen) and RTS100 (5Prime) were used with the handheld device of a PDMS flow cell (incubation chamber of approximately 60 micrometers height, 2×8 mm (FIG. 6 a and b)/2×5 mm (FIG. 6 c+d) and the original DAPA system with a membrane (FIG. 6 e+f). Two erDNA templates were spotted with a Gesim plotter in the PDMS flow cell and upon an epoxy coated glass slide and a subsequently expressed for 90/180 minutes (RTS100) respectively 40/90 minutes (EasyXpress). Afterwards the slides were labelled with anti Cy3-/Cy5 labelled antibodies.

Summary of Experimental Examples

The generation of erDNA using the LTK from Qiagen has been evaluated and demonstrates that any given DNA template may be amplified with a known primer sequence. The two examined cell-free expression systems EasyXpress and RTS100 also demonstrated positive results. The developed handheld devices and their processes of manufacture have been tested and shown to provide beneficial results, demonstrating production time of protein arrays in some cases of 15-20 minutes. With a further reduction in chamber height a reduction in production time is to be expected.

LITERATURE

[1] M. He, O. Stoevesandt, E. A. Palmer, F. Khan, O. Ericsson, M. J. Taussig, Printing protein arrays from DNA arrays, *Nature Methods, vol.* 5, pp. 175-177, 2008

[2] H. Chandra, S. Srivastava, Cell-free synthesis-based protein microarrays and their applications, *Proteomics*, vol. 10, pp. 717-730, 2010

[3] M. Y. He, M. J. Taussig, Single step generation of protein arrays from DNA by cell-free expression and in situ immobilisation (PISA method), *Nucleic Acids Research*, vol. 29, pp. art-e73, 2001

[4] J. Sobek, K. Bartscherer, A. Jacob, J. D. Hoheisel, P. Angenendt, Microarray technology as a universal tool for high-throughput analysis of biological systems, *Combinatorial Chemistry & High Throughput Screening*, vol. 9, pp. 365-380, 2006

[5] N. Ramachandran, et al. Self-assembling protein microarrays, *Science*, vol. 305, pp. 86-90, 2004

[6] N. Ramachandran, S. Srivastava, J. LaBaer, Applications of protein microarrays for biomarker discovery, *Proteomics Clinical Applications*, vol. 2, pp. 1444-1459, 2008

[7] P. Angenendt, L. Nyarsik, W. Szaflarski, J. Glokler, K. H. Nierhaus, H. Lehrach, D. J. Cahill, A. Lueking, Cell-free protein expression and functional assay in nanowell chip format, *Anal. Chem.*, vol. 76, pp. 1844-1849, 2004

[8] R. Khnouf, D. J. Beebe, Z. H. Fan, Cell-free protein expression in a microchannel array with passive pumping, *Lab Chip*, vol. 9, pp. 56-61, 2009

[9] Q. Mei, C. K. Fredrickson, A. Simon, R. Khnouf, Z. H. Fan, Cell-free protein synthesis in microfluidic array devices, *Biotechnology Progress*, vol. 23, pp. 1305-1311, 2007

[10] T. Kinpara, R. Mizuno, Y. Murakami, M. Kobayashi, S. Yamaura, Q. Hasan, Y. Morita, H. Nakano, T. Yamane, E. Tamiya, A picoliter chamber array for cell-free protein synthesis, *J. Biochem. (Tokyo).*, vol. 136, pp. 149-154, 2004

[11] A. Kumar, Z. Liang, Chemical nanoprinting—a novel method for fabricating DNA microchips, *Nucleic Acids Res*, vol. 29, pp. e2, 2001

[12] Q. Du, O. Larsson, H. Swerdlow, Z. Liang, DNA immobilization: Silanized nucleic acids and nanoprinting, 2005, pp. 45-61

[13] A. A. Yu, G. S. Taylor, A. Guiseppe-Elie, H. I. Smith, F. Stellacci, Supramolecular nanostamping: Using DNA as movable type, *Nano Letters*, vol. 5, pp. 1061-1064, 2005

[14] S. Kim, G. Lim, S. E. Lee, J. Lee, K. Yun, J. Park, DNA chip replication for a personalized DNA chip, *Biomolecular Engineering*, vol. 23, pp. 129-134, 2006

[15] J. Kim, R. M. Crooks, Transfer of surface polymerase reaction products to a secondary platform with conservation of spatial registration, *J. Amer. Chem. Soc.*, vol. 128, pp. 12076-12077, 2006

The invention claimed is:

1. Method for producing a molecular microarray, comprising
   a) providing a first support surface (template surface), that exhibits one or more template molecules immobilized on its surface, and an opposing second support surface (capture or microarray surface),
   b) production of an output molecule from said template molecule via a cellfree enzymatic and/or chemical reaction system,
   c) transfer of said output molecule to a second support surface via fluid between the first and second support surface, with a correlation between the location of the template molecules on the first support surface and the deposition of the corresponding output molecules on the second support surface,
   wherein
      assembly of the support surfaces is decoupled from initiation of step b), wherein initiation of step b) is prevented by spatial separation between the support surfaces in the form of a microfluidic incubation chamber (microfluidic gap) formed between opposing separated first and second support surfaces, and wherein introduction of a cell-free enzymatic and/or chemical reaction system into the microfluidic incubation chamber induces production of said output molecule and enables transfer of said output molecule to said second support surface.

2. The method according to claim 1, wherein the initiation in step b) is further prevented by:
a chemical or energetic environment that blocks the cell-free enzymatic and/or chemical reaction system, or
an internal or external force field, via an electric or magnetic field and/or potential that blocks the cell-free enzymatic reaction system.

3. The method according to claim 1, wherein the microfluidic incubation chamber does not comprise of a membrane positioned between the first and second support surfaces.

4. The method according to claim 1, wherein the first support surface and second support surface are held in a fixed position, opposing one another, before initiation of the production of said output molecule via the cell-free enzymatic and/or chemical reaction system of b).

5. The method according to claim 1, wherein the method can be repeated using a single first support surface multiple times for production of multiple microarrays.

6. The method according to claim 1, wherein chemical blocking agents are present on the first and/or second support surfaces, that block the cell-free enzymatic and/or chemical reaction system and/or block binding of the output molecule to the second support surface, which can be modified and/or removed as required to initiate the method, or depletion or restriction of essential chemical compounds for the cell-free enzymatic reaction system.

7. The method according to claim 1, wherein blocking of the cell-free enzymatic and/or chemical reaction system relates to use of light cleavable chemical substituents attached to essential —OH groups of reaction components, wherein treatment with light releases the reaction component and enables reaction initiation, or binding and/or capture of essential reaction components to either the first or second surface, so that reaction initiation occurs only upon filling or an external impulse.

8. The method according to claim 1, wherein the initiation and prevention thereof in b) involves molecular switching of molecules from active to inactive state, or from inactive to active state,
by pH-change, inducing a functional change in pH-sensitive molecules, for example through light treatment of a surface coated with titanium dioxide leading to generation of H+ions and subsequent pH change,
by change in static and/or dynamic electrical and/or magnetic fields, inducing a change in charged, dielectric or magnetic molecules or surface properties,
by change in temperature, inducing a change of the molecular structure or dynamics leading to inactivity of a DNA or RNA polymerase, wherein upon warming reaction initiation occurs,
by illumination, inducing a change of blocked, photosensitive or caged molecules by light induced reactions whereby treatment with light releases the reaction component and enables reaction initiation, and/or release of caged compounds,
or a combination thereof.

9. The method according to claim 1, wherein the template molecule is a nucleic acid or nucleic acid-like molecule.

10. The method according to claim 1, wherein the cell-free enzymatic reaction system is
a DNA-polymerase or a DNA-amplificating enzyme or enzyme system,
a RNA-polymerase or a RNA-amplificating enzyme or enzyme system,
a reverse transcriptase or a RNA-to-DNA transcribing enzyme or enzyme system,
a protein synthesizing system or a cell free expression mix.

11. The method according to claim 10, wherein the cell-free enzymatic reaction system is a DNA-polymerase, the output molecules are DNA and a DNA microarray is generated on the second support surface.

12. The method according to claim 10, wherein the cell-free enzymatic reaction system is a RNA-polymerase, the output molecules are RNA and a RNA microarray is generated on the second support surface.

13. The method according to claim 10, wherein the cell-free enzymatic reaction system is a reverse transcriptase, the output molecules are DNA and a DNA microarray is generated on the second support surface.

14. The method according to claim 10, wherein the cell-free enzymatic reaction system is a protein synthesizing system or a cell free expression mix, the output molecules are protein and a protein microarray is generated on the second support surface.

15. Device for the production of a molecular microarray comprising
a) a first support surface (template surface) that exhibits one or more template molecules immobilized on its surface,
b) a second support surface (capture or microarray surface) assembled with said first support surface, wherein said second support surface is coated with an immobilisation agent configured to covalently or non-covalently attach the output molecule to the surface,
c) wherein a microfluidic incubation chamber (microfluidic gap) is formed between physically separated and opposing first and second support surfaces for a cell-free enzymatic and/or chemical reaction system, thereby decoupling assembly of the support surfaces from initiation of cell-free enzymatic and/or chemical reaction system,
d) a fluid inlet and/or outlet into the incubation chamber, and
e) holder for the two opposing support surfaces in a fixed position, wherein the incubation chamber is maintained as a space between the two opposing support surfaces.

16. The device according to claim 15, wherein
the microfluidic incubation chamber does not consist of a membrane positioned between the first and second support surfaces.

17. The device according to claim 15, wherein
the incubation chamber is maintained as a space between the two opposing support surfaces via:
a spacer between the first and second support surfaces or
one or more three-dimensionally structured (3D) flow cells.

18. The device according to claim 17, wherein
the one or more three-dimensionally structured (3D) flow cells are made of synthetic polymers.

19. The device according to claim 15, wherein
the fluid inlet and/or outlet is suitable for the cell-free enzymatic and/or chemical reaction system to be pumped or pipetted into and/or out of the incubation chamber.

20. The device according to claim 15, wherein the template molecule is a nucleic acid or nucleic acid-like molecule.

21. The device according to claim 15, wherein the spatial separation between the support surfaces is less than 100 micrometer in height.

22. The device according to claim 15, wherein said first and second support surfaces are glass, plastic, nylon or other type of natural or synthetic polymer or membrane.

23. The device according to claim 15, wherein the first and/or second support surface is a standard glass slide(s) suitable for use in microscopy, such as with dimensions of 76 ×26 ×1 mm$^3$.

24. The device according to claim 15, wherein the device is of handheld size.

25. The device according to claim 15, wherein the holder for the two opposing support surfaces in a fixed position relate to mounting brackets (holders), positioned either as upper, lower, or side brackets, positioned in relation to the two support surfaces.

26. The device according to claim 15, wherein either the support surfaces or the mounting brackets (holders) are held in place by mechanical tension, magnetism, a spring system, guiding rails for the surfaces thereby holding the two support surfaces in a fixed position.

27. The device according to claim 15, wherein the immobilization agent is a protein immobilization agent configured to covalently or non-covalently attach to the expressed protein, a polyhistidine sequence such as hexahistidine.

28. The device according to claim 15, wherein the first support surface is
a microarray of nucleic acids or nucleic acid-like molecules,
a sequencing chip exhibiting nucleic acids,
a spatially defined distribution of nucleic acids on a surface,
a spatially defined distribution of nucleic acids on a bead array or a structured surface, or
a spatially defined distribution of liquid or solid material containing nucleic acids.

29. The method according to claim 2, wherein the chemical or energetic environment that blocks the cell-free enzymatic and/or chemical reaction system is a pH value and/or a temperature that limits or blocks the activity of said system.

30. The method according to claim 4, wherein the first support surface and second support surface are held in said fixed position, opposing one another, via a mechanical tension or spring system.

31. The method according to claim 7, wherein the essential reaction components are ATP, essential salts or coenzymes.

32. The method according to claim 31, wherein the coenzymes are vitamins or metal ions.

33. The method according to claim 8, wherein the change in temperature is a reduction in temperature.

34. The method according to claim 8, wherein the change of blocked, photo-sensitive or caged molecules is induced via light cleavable chemical substituents attached to essential reaction components.

35. The method according to claim 8, wherein the treatment with light releases caged biotin or molecules that differ from caged biotin.

36. The method according to claim 9, wherein the nucleic acid or nucleic acid-like molecule is DNA, RNA, genomic DNA, cloned DNA fragments, plasmid DNA, cDNA or cDNA libraries, PCR products, synthetic DNA, DNA oligonucleotides, mRNA or synthetic RNA.

37. The method according to claim 10, wherein the protein synthesizing system or the cell free expression mix is an enzyme mix required for transcription of DNA to RNA and translation of RNA to protein.

38. The method according to claim 37, wherein the enzyme mix required for transcription of DNA to RNA and translation of RNA to protein is a cell-free lysate selected from a prokaryotic or eukaryotic system.

39. The method according to claim 38, wherein the prokaryotic system or eukaryotic system is *E. coli*, of bacterial origin, rabbit reticulocyte, of insect origin, of human origin or wheatgerm.

40. The method according to claim 14, wherein the protein synthesizing system or a cell free expression mix is an enzyme mix required for transcription of DNA to RNA and translation of RNA to protein.

41. The device according to claim 18, wherein the synthetic polymers are thin film polymer materials or polydimethylsiloxane (PDMS).

42. The device according to claim 20, wherein the nucleic acid or nucleic acid-like molecule is DNA, RNA, genomic DNA, cloned DNA fragments, plasmid DNA, cDNA, cDNA libraries, PCR products, synthetic DNA, DNA oligonucleotides, mRNA or synthetic RNA.

43. The device according to claim 21, wherein the spatial separation between the support surfaces is less than 80 micrometer in height.

44. The device according to claim 21, wherein the spatial separation between the support surfaces is less than 65 micrometer in height.

45. The device according to claim 21, wherein the spatial separation between the support surfaces is less than 40 micrometer in height.

46. The device according to claim 21, wherein the spatial separation between the support surfaces is 20 micrometer in height or less.

47. The device according to claim 22, wherein said other type of natural or synthetic polymer or membrane is polydimethylsiloxane (PDMS).

48. The device according to claim 24, wherein the handheld size corresponds to 60-140 mm in length and 30-90 mm in width.

49. The device according to claim 24, wherein the handheld size corresponds to 80-120 mm in length and 40-80 mm in width.

50. The device according to claim 27, wherein
the protein immobilization agent is an antibody configured to covalently or non-covalently attach to an expressed protein, a polyhistidine sequence tag, or a chelating agent.

51. The device according to claim 50, wherein the antibody is specific to the tag and/or is a biotin-binding molecule.

52. The device according to claim 51, wherein the biotin binding molecule is avidin.

53. The device according to claim 50, wherein the polyhistidine sequence is hexahistidine.

54. The device according to claim 50, wherein the chelating agent is Ni-NTA.

* * * * *